(12) United States Patent
Ouis

(10) Patent No.: US 12,174,094 B2
(45) Date of Patent: Dec. 24, 2024

(54) TWIN PNEUMATIC HAMMER

(71) Applicant: KING FAHD UNIVERSITY OF PETROLEUM AND MINERALS, Dhahran (SA)

(72) Inventor: Djamel Ouis, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 376 days.

(21) Appl. No.: 17/896,567

(22) Filed: Aug. 26, 2022

(65) Prior Publication Data
US 2024/0068902 A1    Feb. 29, 2024

(51) Int. Cl.
*G01M 5/00* (2006.01)

(52) U.S. Cl.
CPC ........ *G01M 5/0066* (2013.01); *G01M 5/0058* (2013.01)

(58) Field of Classification Search
CPC .... G01M 5/0066; G01M 5/0058; G01M 7/08; B25D 9/02; B25D 2209/00
See application file for complete search history.

(56) References Cited

U.S. PATENT DOCUMENTS

| 4,862,746 A | 9/1989 | Komatsu |
| 11,162,869 B2 * | 11/2021 | Ouis ............ G01M 5/0058 |
| 2021/0096038 A1 | 4/2021 | Ouis |

FOREIGN PATENT DOCUMENTS

| CN | 105181276 A | 12/2015 |
| CN | 110542610 A | 12/2019 |
| CN | 215525388 U | 1/2022 |
| CS | 269 074 B1 | 8/1990 |

\* cited by examiner

*Primary Examiner* — Matthew G Marini
*Assistant Examiner* — Leo T Hinze
(74) *Attorney, Agent, or Firm* — Oblon, McClelland, Maier & Neustadt, L.L.P.

(57) ABSTRACT

A twin pneumatic hammer is provided. The twin pneumatic hammer includes a first hammer head connected to a first pneumatic cylinder mounted on a first caliper arm, and a second hammer head connected to a second pneumatic cylinder mounted on a second caliper arm. The second hammer head is positioned opposite to the first hammer head. The first and second caliper arms are slidably coupled to a sliding track of a caliper base such that a distance between the first and second caliper arms may be adjusted. A plurality of tubing connects the first and the second pneumatic cylinders to a source of compressed air. An air controller is connected to the source of compressed air and performs a simultaneous impact stroke of the first and second hammer heads by controlling the release of compressed air into the plurality of tubing.

20 Claims, 19 Drawing Sheets

TWIN PNEUMATIC HAMMER

BACKGROUND

Technical Field

The present disclosure is directed to a vibration testing apparatus, and more particularly, to a twin pneumatic hammer and methods for detecting an ovalling mode in a cylindrical object using the twin pneumatic hammer.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cylindrical structures such as concrete columns, trees, and other structures made of metal and wood are used for various construction purpose. Such cylindrical structures may be exposed to a heavy load during the implementation. Further, the structures may develop stresses due to vibrations, heavy wind, and heavy load, and the stresses may cause damage to the structures over a period of time and may affect the load bearing capacity of the structures. Various methods have been developed to detect vibration modes of the cylindrical objects, however, such methods are developed based on particular shape and size of the objects. Further, object holding device of the apparatus may be constrained and does not provide flexibility or adjustability to test any size or shape of the structures.

U.S. Pat. No. 4,862,746A describes a vibration tester for testing nuts and bolts inserted in a hollow cylinder for tightness. The tester includes a holder and a pair of pneumatic hammers mounted on opposite sides of the holder to impart a vibratory motion. If the vibratory motion causes the nuts to loosen, then the tension on the strain gauge changes. However, the vibration tester is limited to such hardware and not implementable for testing cylindrical objects such as beams, trees and support structures. Further, the vibration tester is not capable of impacting strokes simultaneously and analyzing the strength of a cylindrical object.

Patents CN110542610A, CN215525388U, and CN105181276A describe testing apparatuses for rock masses, solar vacuum tubes, and ball valves, respectively, however, the these references are limited to the intended objects. Further, these references do not describe a testing object holding platform that is adjustable and suitable for any type of object to determine an ovalling mode.

US20210096038A1 describes a testing apparatus for determining a strength of cylindrical object. The testing apparatus includes a pair of vibration inducers to produce excitation forces and a vibration sensor and a computing device to detect the ovalling mode. However, this reference does not mention a supporting platform for the cylindrical object that is adjustable and customizable to support any other type of objects to detect the ovalling mode.

Accordingly, it is one object of the present disclosure to provide a twin pneumatic hammer, methods for detecting an ovalling mode in a cylindrical object using a twin pneumatic cylinder and a system for generating an ovalling mode in a cylindrical object. It is also an object of the present disclosure to describe a twin pneumatic hammer that is adjustable, customizable, and portable such that a cylindrical object of any size and shape can be tested using the apparatus.

SUMMARY

In an exemplary embodiment, a twin pneumatic hammer is described. The twin pneumatic hammer includes a first caliper arm and a first hammer head connected to a first pneumatic cylinder. The first pneumatic cylinder is mounted on the first caliper arm. The twin pneumatic hammer further includes a second caliper arm and a second hammer head connected to a second pneumatic cylinder. The second pneumatic cylinder is mounted on the second caliper arm, and the second hammer head is positioned opposite to and facing the first hammer head. The twin pneumatic hammer further includes a caliper base and a sliding track within the caliper base. The sliding track is configured to slidingly hold the first caliper arm and the second caliper arm to the caliper base such that a distance between the first caliper arm and the second caliper arm may be adjusted along a length of the caliper base. The twin pneumatic hammer further includes a ruler located parallel to the sliding track. The ruler includes markings indicating a distance from the first caliper arm to the second caliper arm. The twin pneumatic hammer further includes an air port (not shown) for connecting to a source of compressed air and a plurality of tubing configured to connect the first pneumatic cylinder and the second pneumatic cylinder to the source of compressed air. The twin pneumatic hammer further includes an air controller connected to the source of compressed air. The air controller is configured to perform an impact stroke of the first hammer head and the second hammer head by controlling the release of compressed air into the plurality of tubing.

In another exemplary embodiment, a method for using a twin pneumatic hammer to detect an ovalling mode in a cylindrical object is described. The method includes positioning the twin pneumatic hammer on a cross sectional diagonal of the cylindrical object and securing the twin pneumatic hammer to the cylindrical object by sliding a first caliper arm towards a second caliper arm along a sliding track then locking the first caliper arm and the second caliper arm to the sliding track. The method further includes measuring, with a ruler adjacent to the sliding track, a width of the cylindrical object. The method further includes connecting a first plurality of tubing between a source of compressed air and a cap end port of a first pneumatic cylinder and a cap end port of a second pneumatic cylinder. The method further includes connecting a second plurality of tubing between the source of compressed air and a rod end port of the first pneumatic cylinder and a rod end port of the second pneumatic cylinder. The method further includes connecting a first air valve of an air controller to the first plurality of tubing and a second air valve of the air controller to the second plurality of tubing. The method further includes performing, with the air controller, an impact stroke which simultaneously strikes opposite sides of the cylindrical object with a first hammer head and a second hammer head of the twin pneumatic hammer. The method further includes detecting, with a sensing transducer located on the cylindrical object, vibrations within the cylindrical object due to the impact stroke, generating, with the sensing transducer, sensing signals, and analyzing, with a computing device connected to the sensing transducer, the sensing signals to detect the ovalling mode of the cylindrical object.

In another exemplary embodiment, a system for generating an ovalling mode in a cylindrical object is described. The system includes a twin pneumatic hammer including a first pneumatic hammer and a second pneumatic hammer. A hammer head of the first pneumatic hammer is configured to face a hammer head of the second pneumatic hammer along a cross sectional diagonal of the cylindrical object. The system further includes a first caliper arm configured to support the first pneumatic hammer. An angle between a longitudinal axis of the first caliper arm and an axial line of the first pneumatic hammer is 90 degrees. The system further includes a second caliper arm configured to support the second pneumatic hammer. An angle between a longitudinal axis of the second caliper arm and an axial line of the second pneumatic hammer is 90 degrees. The system further includes a caliper base and a sliding track within the caliper base. The sliding track is configured to slidingly hold the first caliper arm and the second caliper arm to the caliper base such that a distance between the first caliper arm and the second caliper arm may be adjusted along a length of the caliper base. The system further includes a ruler located parallel to the sliding track. The ruler includes markings indicating a distance from the first caliper arm to the second caliper arm. The system further includes a source of compressed air and a plurality of tubing configured to connect a first pneumatic cylinder of the first pneumatic hammer and a second pneumatic cylinder of the second pneumatic hammer to the source of compressed air. The system further includes an air controller connected to the source of compressed air. The air controller is configured to perform an impact stroke of the hammer heads of each of the first pneumatic hammer and the second pneumatic hammer by controlling the release of compressed air into the plurality of tubing. The system further includes a sensing transducer configured to be attached to the cylindrical object. The sensing transducer is configured to sense vibrations in the cylindrical object and generate sensing signals. The system further includes computing device connected to the air controller and the sensing transducer. The computing device includes a memory storing program instructions and at least one processor configured to execute the program instructions. The program instructions are configured to trigger the air controller to perform the impact stroke, receive the sensing signals, store the sensing signals in the memory, and analyze the sensing signals to detect the ovalling mode of the cylindrical object.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
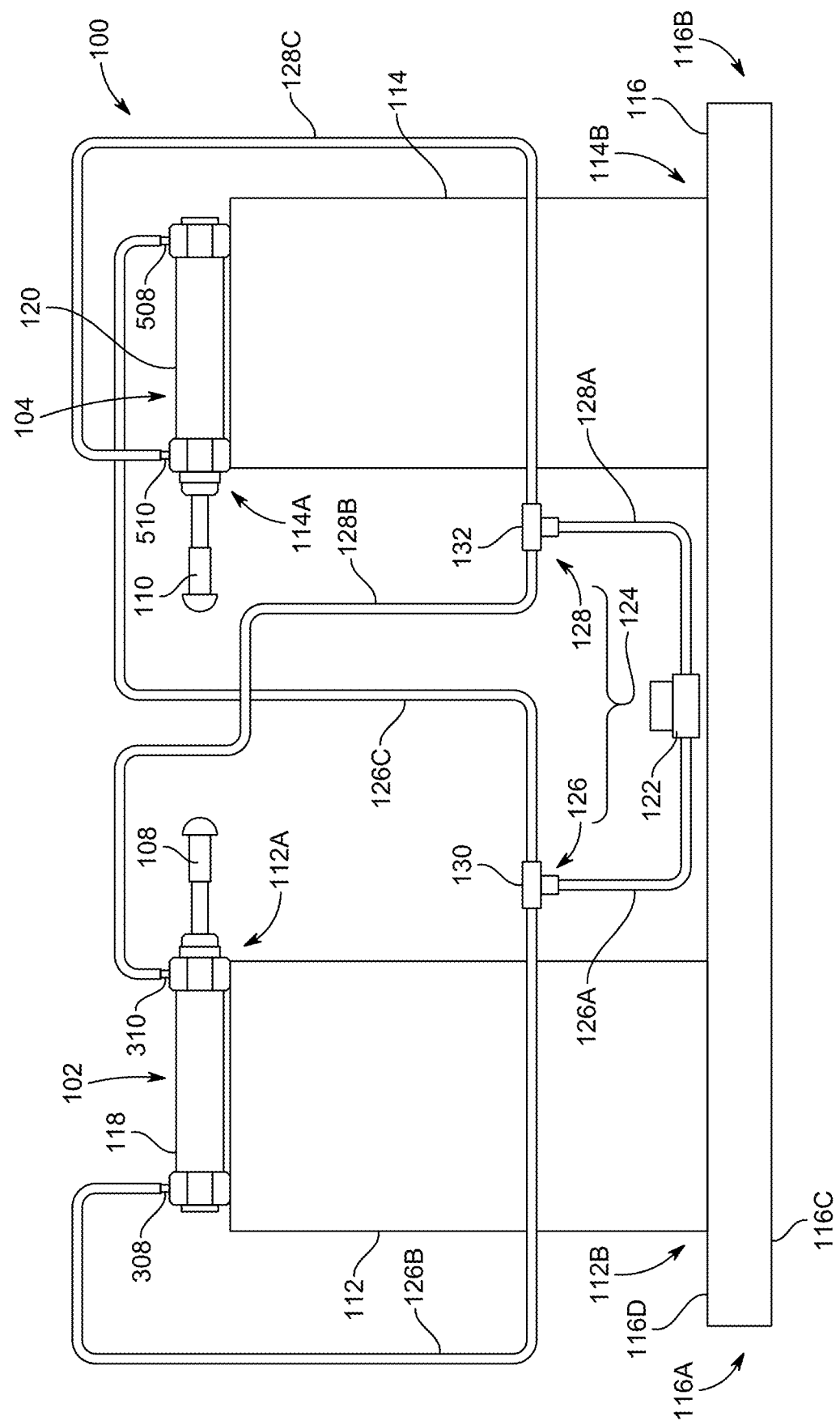
FIG. 1 is a schematic block diagram of a twin pneumatic hammer, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a twin pneumatic hammer, a system for generating an ovalling mode in a cylindrical object, and a method for using the twin pneumatic hammer to detect the ovalling mode in the cylindrical object. The twin pneumatic hammer includes two heads having a first hammer head connected to a first pneumatic cylinder mounted on a first caliper arm and a second hammer head connected to a second pneumatic cylinder mounted on a second caliper arm. The first hammer head and the second hammer head are positioned opposite to each other to contact with a cross sectional diagonal of the cylindrical object. The twin pneumatic hammer further includes a caliper base and a sliding track disposed within the caliper base. The sliding track slidingly holds the first caliper arm and the second caliper arm to the caliper base such that a distance between the first caliper arm and the second caliper arm may be adjusted along a length of the caliper base. The twin pneumatic hammer further includes a source of compressed air, an air controller connected to the source of compressed air, and a plurality of tubing connected the first pneumatic cylinder and the second pneumatic cylinder to the air controller. The method for detecting the ovalling mode in the cylindrical object includes, simultaneously impacting opposite sides of the cylindrical object with the first hammer head and the second hammer head, detecting, with a sensing transducer, vibrations in the cylindrical object caused by the impact stroke from the first and second hammer heads, and analyzing the vibrations to detect the ovalling mode of the cylindrical object.

Referring to FIG. 1, a schematic block diagram of a twin pneumatic hammer 100 is illustrated, according to an aspect of the present disclosure. The twin pneumatic hammer is used for detecting an ovalling mode in a cylindrical object. The ovalling mode may be defined as a type of vibration that involves deformation of a cross section of the cylindrical object. In a non-limiting example, the cylindrical object may be a cylindrical concrete column or a cylindrical body, made of metal or any other material known in the art, coupled to a ground surface or suspended by another structure. In some aspects of the present disclosure, the twin pneumatic hammer 100 may be used for detecting an ovalling mode vibration in a body having a polygonal cross-section or any other cross sectional shape known in the art. Characteristics of the ovalling mode are used to identify the state of health of the cylindrical object. The twin pneumatic hammer 100 incudes a first pneumatic hammer 102 and a second pneumatic hammer 104. The first and second pneumatic hammers 102, 104 are mounted on a supporting platform in such a way that a hammer head 108 of the first pneumatic hammer 102 is configured to face a hammer head 110 of the second pneumatic hammer 104 along a coaxial line. The coaxial line may be defined as a line that is coaxial to an axial line of each of the hammer head 108 of the first pneumatic hammer 102 and the hammer head 110 of the second pneumatic hammer 104. The hammer head 108 of the first pneumatic hammer 102 may be alternatively referred to as 'the first hammer head 108' and the hammer head 110 of the second pneumatic hammer 104 may be alternatively referred to as 'the second hammer head 110'. The first hammer head 108 and the second hammer head 110 are collectively referred to as 'the hammer heads' and individually referred to as 'the hammer head' unless otherwise specifically mentioned. When the first pneumatic hammer 102 and the second pneumatic hammer 104 are mounted on the supporting platform, the second hammer head 110 is positioned opposite to and facing the first hammer head 108. During an implementation of the twin pneumatic hammer 100, the first hammer head 108 is configured to face the second hammer head 110 along a cross sectional diagonal of the cylindrical object. The cross sectional diagonal of the cylindrical object may be defined as a diagonal line extending along a transverse axis defined by a diameter of the cylindrical object.

The twin pneumatic hammer 100 further includes a first caliper arm 112 and a second caliper arm 114 configured to movably support the first pneumatic hammer 102 and the second pneumatic hammer 104, respectively. The first pneumatic hammer 102 and the second pneumatic hammer 104 may be collectively referred to as 'the pneumatic hammers' and individually referred to as 'the pneumatic hammer' unless otherwise specifically mentioned. The first caliper arm 112 and the second caliper arm 114 are further movably supported on a caliper base 116. The caliper base 116, the first caliper arm 112 and the second caliper arm 114 together constitute the supporting platform. The caliper base 116 may be an elongated body having a first end 116A and a second end 116B. In a non-limiting example, the caliper base 116 may have a rectangular cross section such that a bottom surface 116C may be configured to be supported on a ground surface and a top surface 116D may be configured to movably support the first caliper arm 112 and the second caliper arm 114. The first caliper arm 112 and the second caliper arm 114 may be collectively referred to as 'the caliper arms' and individually referred to as 'the caliper arm' unless otherwise specifically mentioned. The first caliper arm 112 and the second caliper arm 114 are identical in structure and dimensional specifications. In a non-limiting example, the caliper arm is an elongated body movably and vertically coupled to the caliper base 116. The caliper arm includes a bottom end configured to movably engage with the top surface 116D of the caliper base 116 and a top end configured to firmly support the pneumatic hammer. Particularly, a top end 112A of the first caliper arm 112 is configured to support the first pneumatic hammer 102 and a bottom end 112B of the first caliper arm 112 is configured to movably engage with the top surface 116D of the caliper base 116. Further, an angle defined between a longitudinal axis of the first caliper arm 112 and an axial line of the first pneumatic hammer 102 is 90 degrees. Similarly, a top end 114A of the second caliper arm 114 is configured to support the second pneumatic hammer 104 and a bottom end 114B is configured to movably engage with the top surface 116D of the caliper base 116. Further, an angle defined between a longitudinal axis of the second caliper arm 114 and an axial line of the second pneumatic hammer 104 is 90 degrees. In a non-limiting example, a cross-sectional shape of the caliper arm may be a rectangle, a square, a circle, an oval, an elliptical or any other polygon shape known in the art. In the present disclosure, the caliper arm is designed as a straight structure, however, in some aspects, the caliper arm may be defined as a curved structure or a bent structure having a top end configured to couple with the pneumatic hammer and a bottom end configured to movably engage with the caliper base 116. In some aspects of the present disclosure, the first caliper arm 112 may be a straight structure and the second caliper arm 114 may be a curved or a bent structure, and vice versa. In some aspects of the present disclosure, construction and dimensional specifications of the first caliper arm 112 and the second caliper arm 114 may be different while keeping the axial line of the first pneumatic hammer 102 and the axial line of the second pneumatic hammer 104 are coaxial and placed the first hammer head 108 and the second hammer head 110 facing each other.

The first pneumatic hammer 102 includes a first pneumatic cylinder 118 mounted on the first caliper arm 112 and the second pneumatic hammer 104 includes a second pneumatic cylinder 120 mounted on the second caliper arm 114. Further, the first hammer head 108 and the second hammer head 110 of the first pneumatic hammer 102 and the second pneumatic hammer 104 are connected to the first pneumatic cylinder 118 and the second pneumatic cylinder 120, respectively. Particularly, the first pneumatic cylinder 118 and the second pneumatic cylinder 120 are connected to the top ends 112A and 114A of the first caliper arm 112 and the second caliper arm 114, respectively. The first pneumatic cylinder 118 and the second pneumatic cylinder 120 may be collectively referred to as 'the pneumatic cylinders' and individually referred to as 'the pneumatic cylinder' unless otherwise specifically mentioned. In some aspects of the present disclosure, the pneumatic cylinder may be detachably coupled to the caliper arm via a plurality of fasteners. In some aspects of the present disclosure, the pneumatic cylinder may be welded to the caliper arm. In some aspects of the present disclosure, the pneumatic cylinder may be movably coupled to the caliper arm such that the caliper arm and the pneumatic cylinder may be together adjusted based on a size and a shape of the cylindrical object during an implementation of the twin pneumatic hammer 100.

The twin pneumatic hammer 100 further includes a source of compressed air 122. In one aspect of the present disclosure, the source of compressed air 122 may be a device which is used to compress air received from the atmosphere and store in a container for further use. In another aspect of the present disclosure, the source of compressed air 122 may be a container storing compressed air for use of the twin pneumatic hammer 100. In some aspects of the present disclosure, the source of compressed air 122 is one of an air cannister and a portable air compressor. Based on various applications and implementations of the twin pneumatic hammer 100, a type of the source of compressed air may be considered. In an example, a portable air compressor may be used when the twin pneumatic hammer 100 is used in on-field applications, whereas an air canister may be used when the twin pneumatic hammer 100 is used in a laboratory setting. In some aspects of the present disclosure, the source of compressed air 122 may be mounted on the caliper base 116.

The twin pneumatic hammer 100 further includes a plurality of tubing 124 configured to connect the first pneumatic cylinder 118 of the first pneumatic hammer 102 and the second pneumatic cylinder 120 of the second pneumatic hammer 104 to the source of compressed air 122. The plurality of tubing 124 may include multiple conduits configured to fluidly communicate the pneumatic cylinders with the source of compressed air 122 via one or more valves and connectors. The plurality of tubing 124 may be made of hard materials such as metals or metal alloys such that change in air compression characteristics while loading the pneumatic cylinders may be avoided.

In an aspect of the present disclosure, the plurality of tubing 124 includes a first plurality of tubing 126 and a second plurality of tubing 128 configured to connect the source of compressed air 122 with the first and second pneumatic cylinders 118, 120. The first plurality of tubing 126 is connected by a first T branch divider 130 of the twin pneumatic hammer 100. The first plurality of tubing 126 includes a first tubing 126A, a second tubing 126B, and a third tubing 126C. The first T branch divider 130 is connected by the first tubing 126A to the source of compressed air 122, by the second tubing 126B to the first pneumatic cylinder 118, and by the third tubing 126C to the second pneumatic cylinder 120. Similarly, the second plurality of tubing 128 is connected by a second T branch divider 132 of the twin pneumatic hammer 100. The second plurality of tubing 128 includes a fourth tubing 128A, a fifth tubing 128B, and a sixth tubing 128C. The second T branch divider 132 is connected by the fourth tubing 128A to the source of compressed air 122, by the fifth tubing 128B to the first pneumatic cylinder 118 and by the sixth tubing 128C to the second pneumatic cylinder 120. In some aspects of the present disclosure, each of the first plurality of tubing 126 and the second plurality of tubing 128 may be connected by Y branch divider.

In some aspects of the present disclosure, a length of the first tubing 126A is equal to a length of the fourth tubing 128A, a length of the second tubing 126B is equal to a length of the third tubing 126C, and a length of the fifth tubing 128B is equal to a length of the sixth tubing 128C. Particularly, the length, diameter and shape of the pair of tubing such as the first tubing 126A and the fourth tubing 128A, the second tubing 126B and the third tubing 126C, and the fifth tubing 128B and the sixth tubing 128C may be made identical to avoid any imbalance in the amount of force induced by the first hammer head 108 and the second hammer head 110.

Figure 2A:
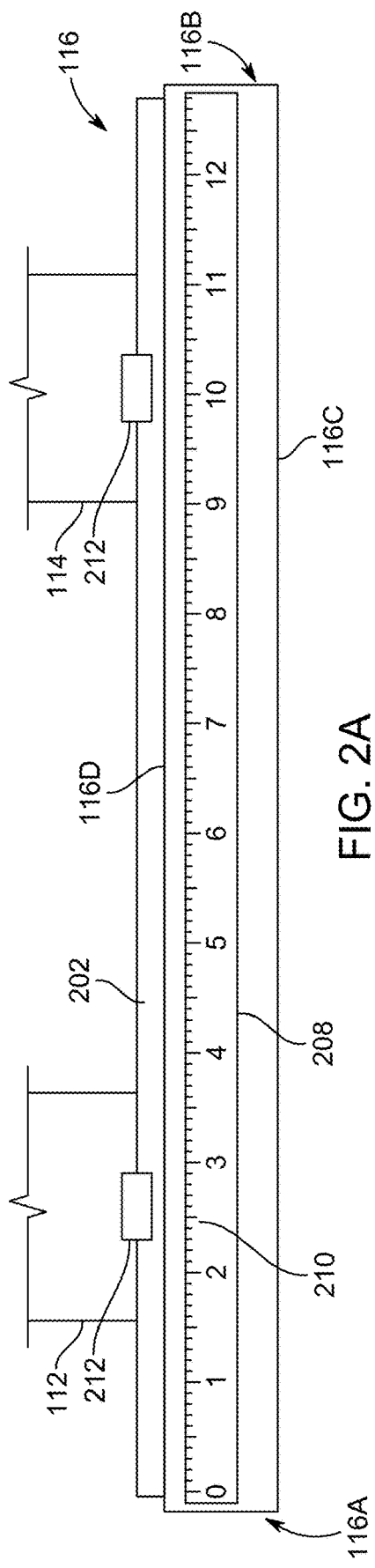
FIG. 2A is a schematic block diagram showing a caliper base of the twin pneumatic hammer having a sliding track and a ruler disposed therein, according to certain embodiments.

Referring to FIG. 2A, a schematic block diagram of the caliper base 116 of the twin pneumatic hammer 100 is illustrated, according to an aspect of the present disclosure. The caliper base 116 includes a sliding track 202 which is configured to slidingly hold the first caliper arm 112 and the second caliper arm 114 to the caliper base 116. Particularly, the sliding track 202 is provided within the caliper base 116 at the top surface 116D thereof. In one aspect of the present disclosure, the caliper base 116 may include the sliding track 202 having a length equal to a length of the caliper base 116 such that the sliding track 202 extends from the first end 116A to the second end 116B of the caliper base 116. In such a case, the first caliper arm 112 and the second caliper arm 114 may be slidably engaged with the sliding track 202 and movable between the first end 116A and the second end 116B of the caliper base 116. In another aspect of the present disclosure, the caliper base 116 may include a pair of sliding tracks. One sliding track may be disposed within the caliper base 116 adjacent to the first end 116A thereof to slidably engage with the first caliper arm 112. Similarly, another sliding track may be disposed within the caliper base 116 adjacent to the second end 116B thereof to slidably engage with the second caliper arm 114. Such that the pair of sliding tracks is configured to independently move the first and the second caliper arms 112, 114 along a length thereof.

Figure 2B:
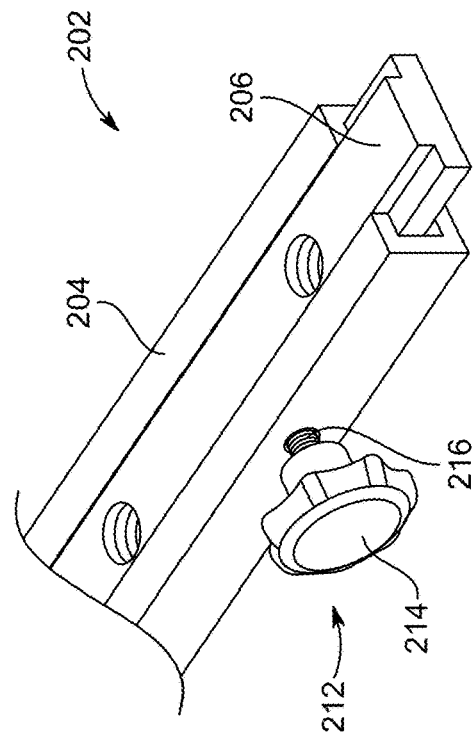
FIG. 2B is a schematic partial perspective view of an exemplary sliding track of the twin pneumatic hammer, according to certain embodiments.

In a non-limiting example, referring to FIG. 2B, the sliding track 202 may include a rail 204 coupled to the caliper base 116. Particularly, the rail 204 may be coupled to the top surface 116D or side surfaces of the caliper base 116 using fastening members such as bolts and nuts. In some examples, the rail 204 may be coupled to the caliper base 116 using a press fit or a snug fit. The sliding track 202 further includes a rack 206 configured to engage with the bottom end of the caliper arm. Particularly, the rack 206 may be coupled to the bottom end of the caliper arm using fastening members such as bolts and nuts. In some examples, the rack 206 may be coupled to the caliper arm using a press fit or a snug fit. The rack 206 is slidably engaged with the rail 204 such that the first caliper arm 112 and the second caliper arm 114 are slidably coupled to the caliper base 116. The rack 206 may be an elongated bar configured to slidably engage with the rail 204. In an alternate example, the rack 206 may be a plurality of rollers configured to slidably engage with the rail 204.

The twin pneumatic hammer 100 further includes a ruler 208 located parallel to the sliding track 202. In one example, the ruler 208 may be an individual component detachably attached to the caliper base 116. Particularly, the ruler 208 may be attached to the top surface 116D or the side surfaces of the caliper base 116 using fastening members, a press fit, or a snug fit. The ruler 208 includes markings 210 indicating a distance from the first caliper arm 112 to the second caliper arm 114. In another example, the ruler 208 having the markings 210 may be defined on the top surface 116D or the side surfaces of the caliper base 116. In such a case, the markings 210 may be embossed or engraved on the top surface 116D or the side surfaces of the caliper base 116. In some examples, the markings 210 may be defined with color codes for easy visualization thereof. An operator may enter the distance between the first caliper arm 112 and the second caliper arm 114 as read on the ruler 208 into an interface of a computing device which analyzes sensor signals detected by a sensing transducer related to an ovalling mode induced by action of the twin pneumatic hammer 100.

Referring to FIG. 2A and FIG. 2B, the first caliper arm 112 and the second caliper arm 114 are slidably coupled to the caliper base 116 using the sliding track 202 such that a distance between the first caliper arm 112 and the second caliper arm 114 may be adjusted along the length of the caliper base 116. The twin pneumatic hammer 100 further includes a locking mechanism 212 connected to the sliding track 202. The locking mechanism 212 is configured to lock the first caliper arm 112 and the second caliper arm 114 at a positioning distance. The positioning distance may be defined as a distance between the first caliper arm 112 and the second caliper arm 114 upon positioning the first caliper arm 112 and the second caliper arm 114 along the cross sectional diagonal of the cylindrical object. In one aspect of the present disclosure, the locking mechanism 212 is attached to the sliding track 202 to lock the movement of the rack 206 attached to the caliper arm with the rail 204 attached to the caliper base 116. In another aspect of the present disclosure, the locking mechanism 212 may be attached to the caliper base 116 to lock the caliper arm with the sliding track 202 or the caliper base 116. In yet another aspect of the present disclosure, the locking mechanism 212 may be attached to the rack 206 of the caliper arm to engage with the rail 204 attached to the caliper base 116. In a non-limiting example, the locking mechanism 212 may include a knob 214 and a threaded shank 216 to engage the caliper arm with the sliding track 202. In some examples, the locking mechanism 212 may include a first engaging part associated with the rail 204 of the caliper base 116 and a second engaging part associated with the rack 206 of the caliper arm to lock the caliper arm with the sliding track 202.

Figure 3:
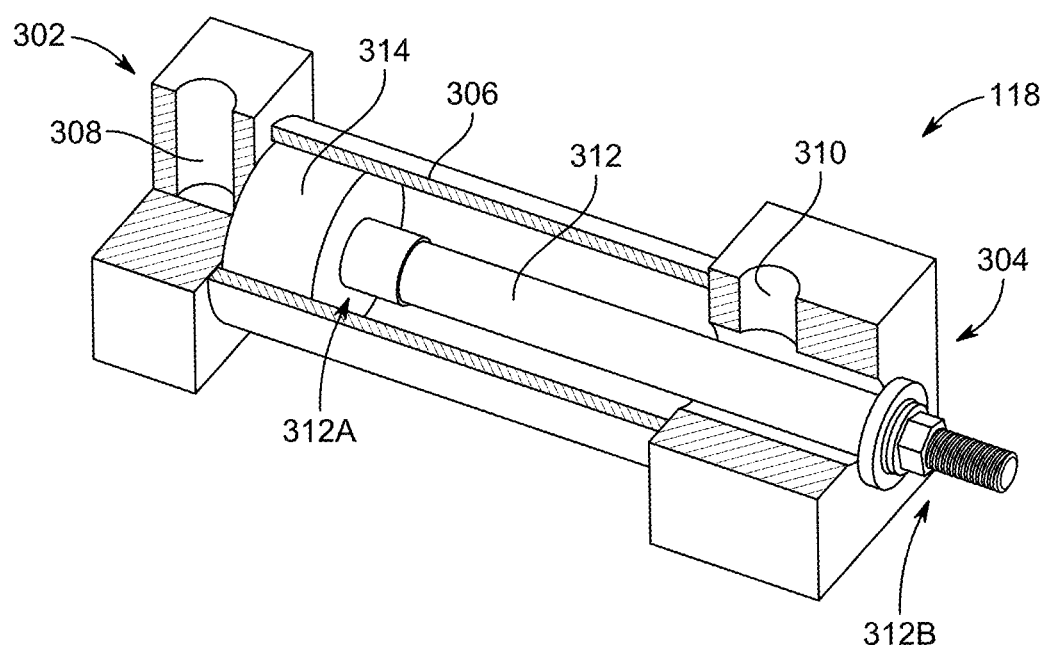
FIG. 3 is a schematic perspective view of an exemplary first pneumatic cylinder of the twin pneumatic hammer, according to certain embodiments.

Referring to FIG. 3, a schematic perspective view of the first pneumatic cylinder 118 of the twin pneumatic hammer 100 is illustrated, according to an aspect of the present disclosure. The first pneumatic cylinder 118 includes a first end 302 and a second end 304, which are configured to fluidly communicate with the source of compressed air 122 via the plurality of tubing 124 to receive the compressed air. Particularly, the first pneumatic cylinder 118 includes a first cylindrical body 306 defining a chamber to receive the compressed air. The first pneumatic cylinder 118 further includes a cap end port 308 located at the first end 302 thereof and a rod end port 310 located at the second end 304 thereof. Particularly, the chamber defined by the first cylindrical body 306 is in communication with the cap end port 308 and the rod end port 310. The cap end port 308 and the rod end port 310 are configured to fluidly couple with the plurality of tubing 124. The twin pneumatic hammer 100 further includes a first piston rod 312 located within the first pneumatic cylinder 118. The first piston rod 312 is slidably received within the chamber of the first cylindrical body 306 through the second end 304 of the first pneumatic cylinder 118. The first piston rod 312 includes a cap end 312A received within the chamber of the first cylindrical body 306 and a rod end 312B projected outside the first cylindrical body 306 through the second end 304 of the first pneumatic cylinder 118. The twin pneumatic hammer 100 further includes a first piston 314 connected to the cap end 312A of the first piston rod 312 within the chamber. The first piston 314 is slidably disposed within the chamber of the first cylindrical body 306 and establishes an air-tight connection with an inner surface of the first cylindrical body 306 to avoid any air leakage therethrough. The first hammer head 108 of the first pneumatic hammer 102 is connected to the rod end 312B of the first piston rod 312.

Figure 4A:
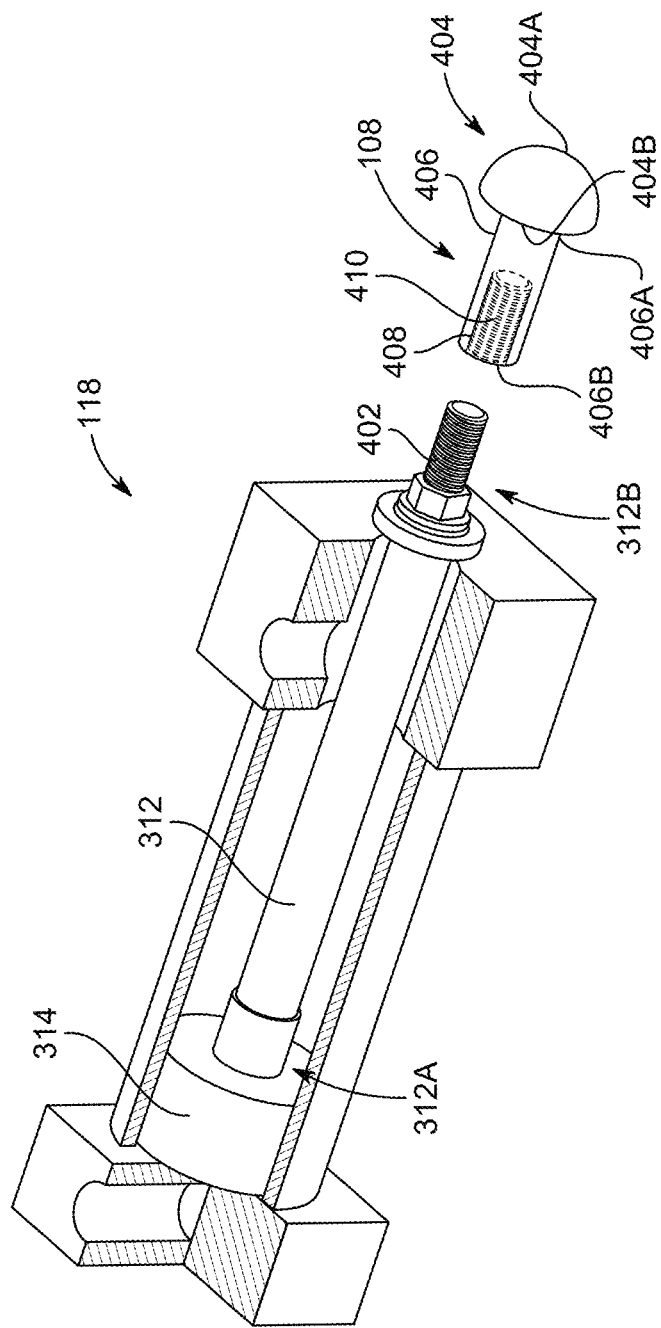
FIG. 4A is a schematic perspective view illustrating an assembly of an exemplary first hammer head of the twin pneumatic hammer with the first pneumatic cylinder using threads, according to one embodiment.

Referring to FIG. 4A, a schematic perspective view showing an assembly of the first hammer head 108 of the twin pneumatic hammer 100 with the first pneumatic cylinder 118 is illustrated, according to an aspect of the present disclosure. As shown in FIG. 4A, male threads 402 are formed in the rod end 312B of the first piston rod 312. The first hammer head 108 includes a head portion 404 and a shank portion 406 extending from the head portion 404. In a non-limiting example, the head portion 404 is defined as a semi spherical body having a curved surface 404A configured to abut the cylindrical object during an implementation, and a flat surface 404B facing the first pneumatic cylinder 118. The shank portion 406 includes a first end 406A connected to the flat surface 404B of the head portion 404 and a second end 406B configured to engage with the rod end 312B of the first piston rod 312. In one example, the first end 406A of the shank portion may be detachably connected to the flat surface 404B of the head portion 404. In another example, the shank portion 406 may be integral to the head portion 404 to form as a single component. The second end 406B of the shank portion 406 includes a connection port 408 configured to receive the rod end 312B of the first piston rod 312. Particularly, female threads 410 are formed in the connection port 408. When the rod end 312B of the first piston rod 312 is received within the connection port 408 of the shank portion 406, the male threads 402 and the female threads 410 are threadably engaged with each other to connect the first hammer head 108 to the rod end 312B of the first piston rod 312.

Figure 4B:
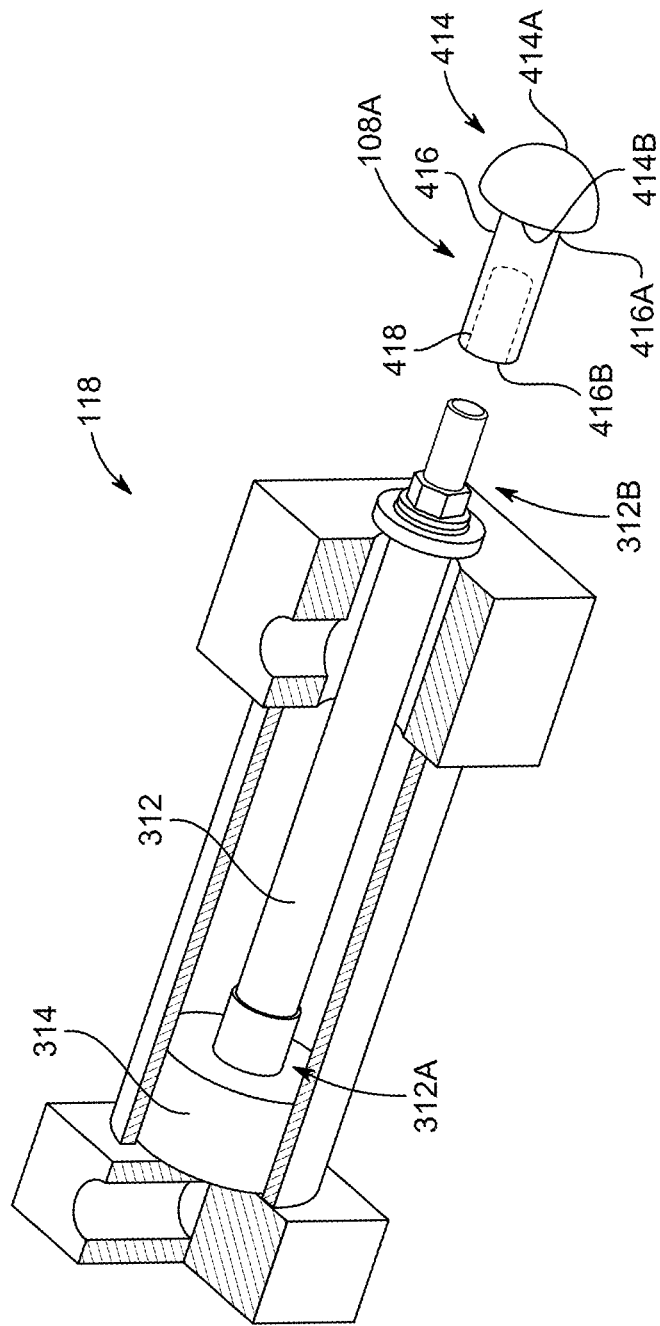
FIG. 4B is a schematic perspective view illustrating an assembly of an exemplary first hammer head of the twin pneumatic hammer with the first pneumatic cylinder using welding, according to another embodiment.

Referring to FIG. 4B, a schematic perspective view showing an assembly of a first hammer head 108A of the twin pneumatic hammer 100 with the first pneumatic cylinder 118 is illustrated, according to another aspect of the present disclosure. As shown in FIG. 4B, the first hammer head 108A includes a head portion 414 and a shank portion 416 extending from the head portion 414. In a non-limiting example, the head portion 414 is defined as a semi spherical body having a curved surface 414A configured to abut the cylindrical object during an implementation, and a flat surface 414B facing the first pneumatic cylinder 118. The shank portion 416 includes a first end 416A connected to the flat surface 414B of the head portion 414 and a second end 416B configured to engage with the rod end 312B of the first piston rod 312. In a non-limiting example, the second end 416B of the shank portion 416 may include a receiving portion 418 configured to receive a portion of the rod end 312B of the first piston rod 312 such that, after the rod end 312B of the first piston rod 312 is received within the receiving portion 418 of the shank portion 416, a weld seam is provided between the shank portion 416 of the first hammer head 108A and the rod end 312B of the first piston rod 312. As such, the first hammer head 108A is connected by welding to the rod end 312B of the first piston rod 312.

Figure 4C:
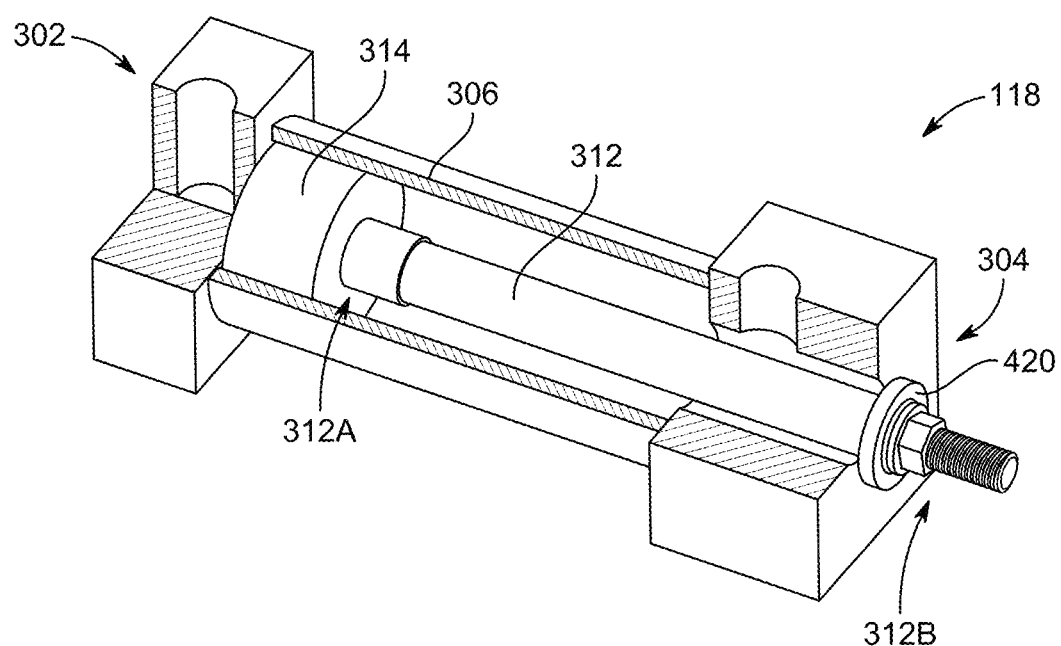
FIG. 4C is a schematic perspective view of the first pneumatic cylinder showing an exemplary first clutch for engaging with a first piston rod, according to certain embodiments.

Referring to FIG. 4C, a schematic perspective view of the first pneumatic cylinder 118 showing a first clutch 420 for engaging with the first piston rod 312 is illustrated, according to an aspect of the present disclosure. As shown in FIG. 4C, the first clutch 420 is located within the first pneumatic cylinder 118. Particularly, the first clutch 420 is located at the second end 304 of the first pneumatic cylinder 118 outside the chamber of the first cylindrical body 306. The first clutch 420 is configured to lock the first piston rod 312 after each impact stroke. The first clutch 420 may be operated pneumatically, hydraulically, mechanically, or a combination thereof. In an example, the first clutch 420 may include one or more friction ring members configured to engage the first piston rod 312 with the first cylindrical body 306 mechanically when the first piston rod 312 moves to cause one stroke. In another example, the first clutch 420 may include one or more calipers which may be actuated pneumatically, hydraulically, or electronically to lock the first piston rod 312 after each stroke.

Figure 5:
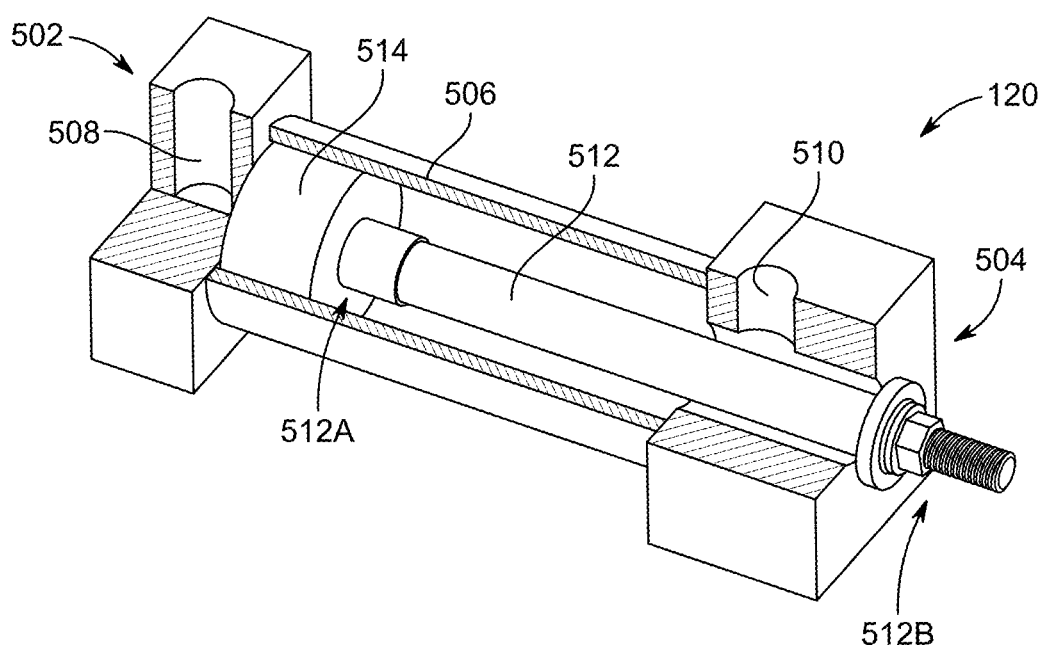
FIG. 5 is a schematic perspective view of an exemplary second pneumatic cylinder of the twin pneumatic hammer, according to certain embodiments.

Referring to FIG. 5, a schematic perspective view of the second pneumatic cylinder 120 of the twin pneumatic hammer 100 is illustrated, according to an aspect of the present disclosure. The second pneumatic cylinder 120 includes a first end 502 and a second end 504, and is configured to fluidly communicate with the source of compressed air 122 via the plurality of tubing 124 to receive the compressed air. Particularly, the second pneumatic cylinder 120 includes a second cylindrical body 506 defining a chamber to receive the compressed air. The second pneumatic cylinder 120 further includes a cap end port 508 located at the first end 502 thereof and a rod end port 510 located at the second end 504 thereof. Particularly, the chamber defined by the second cylindrical body 506 is in communication with the cap end port 508 and the rod end port 510. The cap end port 508 and the rod end port 510 are configured to fluidly couple with the plurality of tubing 124. The twin pneumatic hammer 100 further includes a second piston rod 512 located within the second pneumatic cylinder 120. The second piston rod 512 is slidably received within the chamber of the second cylindrical body 506 through the second end 504 of the second pneumatic cylinder 120. The second piston rod 512 includes a cap end 512A received within the chamber of the second cylindrical body 506 and a rod end 512B projected outside the second cylindrical body 506 through the second end 504 of the second pneumatic cylinder 120. The twin pneumatic hammer 100 further includes a second piston 514 connected to the cap end 512A of the second piston rod 512 within the chamber. The second piston 514 is slidably disposed within the chamber of the second cylindrical body 506 and establishes an air-tight connection with an inner surface of the second cylindrical body 506 to avoid any air leakage therethrough. The second hammer head 110 of the second pneumatic hammer 104 is connected to the rod end 512B of the second piston rod 512.

Figure 6A:
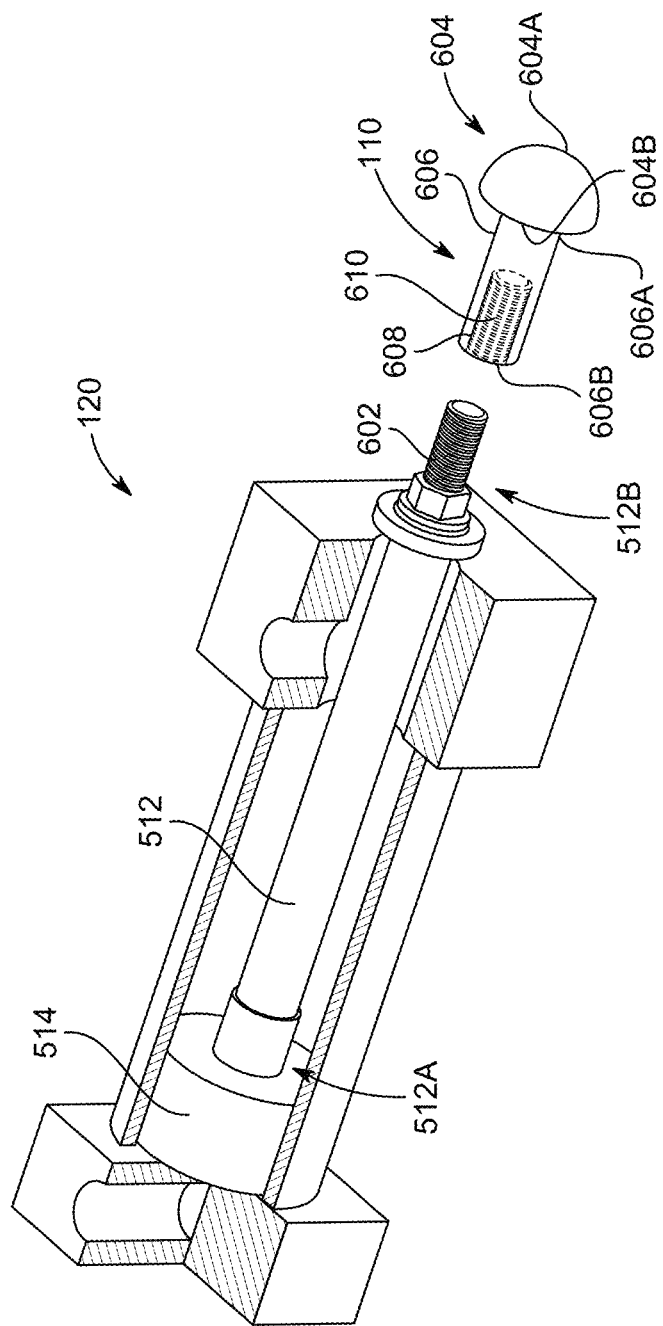
FIG. 6A is a schematic perspective view illustrating an assembly of an exemplary second hammer head of the twin pneumatic hammer with the second pneumatic cylinder using threads, according to one embodiment.

Referring to FIG. 6A, a schematic perspective view showing an assembly of the second hammer head 110 of the twin pneumatic hammer 100 with the second pneumatic cylinder 120 is illustrated, according to an aspect of the present disclosure. As shown in FIG. 6A, male threads 602 are formed in the rod end 512B of the second piston rod 512. The second hammer head 110 includes a head portion 604 and a shank portion 606 extending from the head portion 604. In a non-limiting example, the head portion 604 is defined as a semi spherical body having a curved surface 604A configured to abut the cylindrical object during an implementation, and a flat surface 604B facing the second pneumatic cylinder 120. The shank portion 606 includes a first end 606A connected to the flat surface 604B of the head portion 604 and a second end 606B configured to engage with the rod end 512B of the second piston rod 512. In one example, the first end 606A of the shank portion 606 may be detachably connected to the flat surface 604B of the head portion 604. In another example, the shank portion 606 may be integral to the head portion 604 to form as a single component. The second end 606B of the shank portion 606 includes a connection port 608 configured to receive the rod end 512B of the second piston rod 512. Particularly, female threads 610 are formed in the connection port 608. When the rod end 512B of the second piston rod 512 is received within the connection port 608 of the shank portion 606, the male threads 602 and the female threads 610 are threadably engaged each other to connect the second hammer head 110 to the rod end 512B of the second piston rod 512.

Figure 6B:
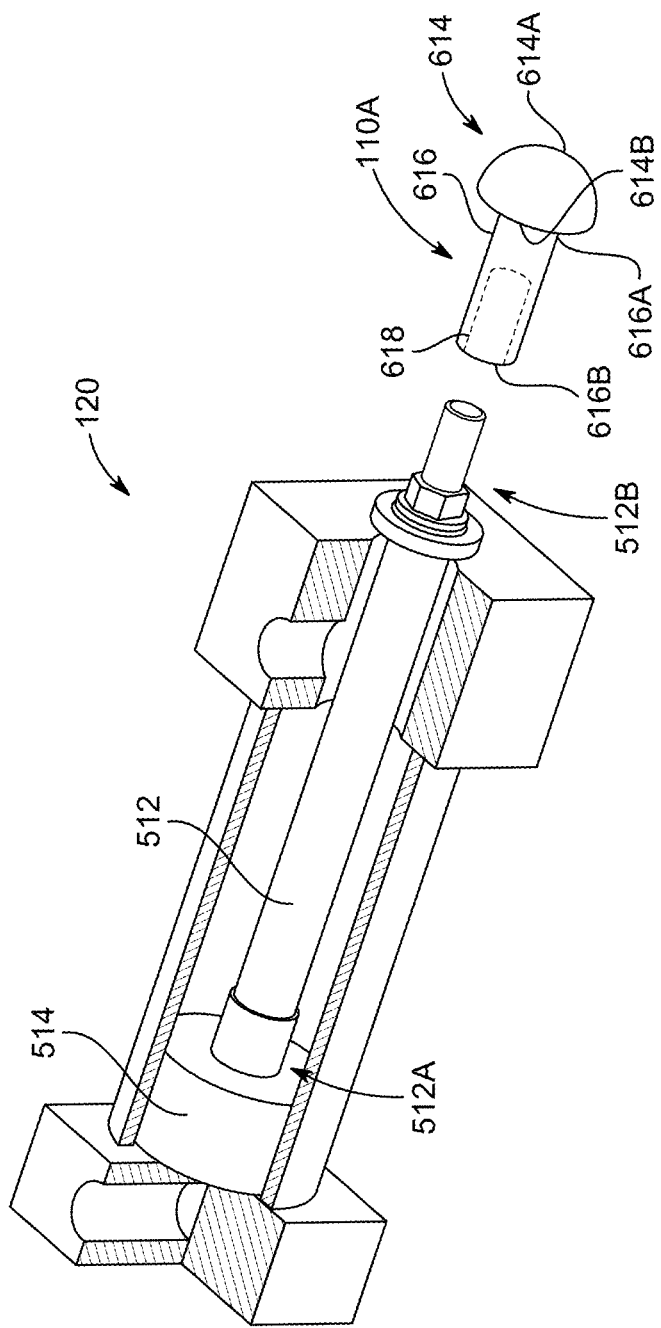
FIG. 6B is a schematic perspective view illustrating an assembly of an exemplary second hammer head of the twin pneumatic hammer with the second pneumatic cylinder using welding, according to another embodiment.

Referring to FIG. 6B, a schematic perspective view showing an assembly of a second hammer head 110A of the twin pneumatic hammer 100 with the second pneumatic cylinder 120 is illustrated, according to another aspect of the present disclosure. As shown in FIG. 6B, the second hammer head 110A includes a head portion 614 and a shank portion 616 extending from the head portion 614. In a non-limiting example, the head portion 614 is defined as a semi spherical body having a curved surface 614A configured to abut the cylindrical object during an implementation, and a flat surface 614B facing the second pneumatic cylinder 120. The shank portion 616 includes a first end 616A connected to the flat surface 614B of the head portion 614 and a second end 616B configured to engage with the rod end 512B of the second piston rod 512. In a non-limiting example, the second end 616B of the shank portion 616 may include a receiving portion 618 configured to receive a portion of the rod end 512B of the second piston rod 512 such that, after the rod end 512B of the second piston rod 512 is received within the receiving portion 618 of the shank portion 616, a weld seam is provided between the shank portion 616 of the second hammer head 110A and the rod end 512B of the second piston rod 512. As such, the second hammer head 110A is connected by welding to the rod end 512B of the second piston rod 512.

Figure 6C:
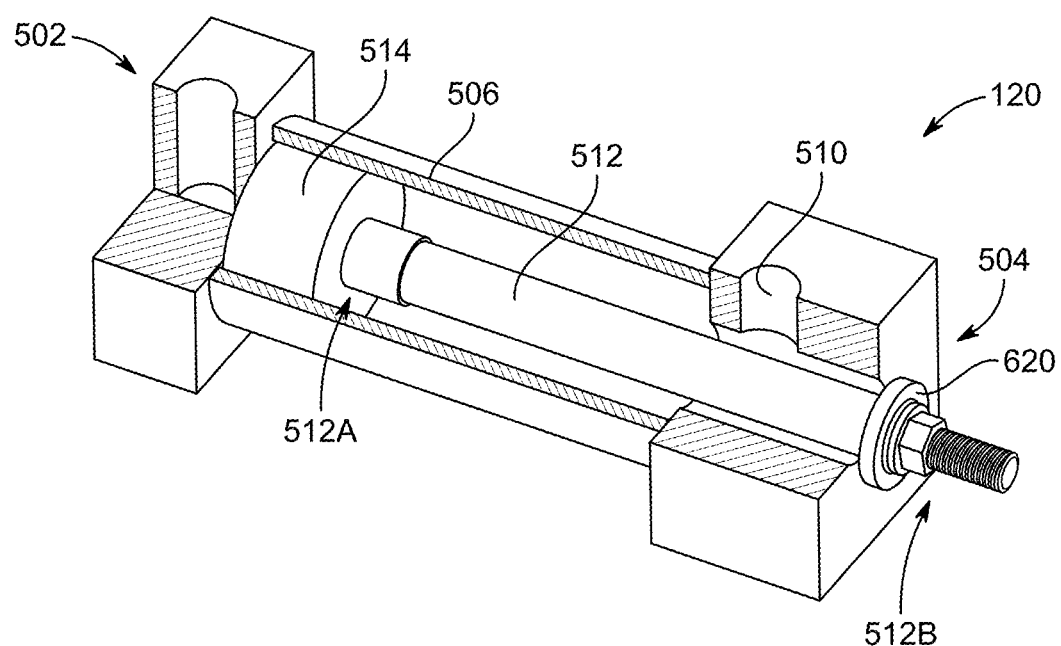
FIG. 6C is a schematic perspective view of the second pneumatic cylinder showing an exemplary second clutch for engaging with a second piston rod, according to certain embodiments.

Referring to FIG. 6C, a schematic perspective view of the second pneumatic cylinder 120 showing a second clutch 620 for engaging with the second piston rod 512 is illustrated, according to an aspect of the present disclosure. As shown in FIG. 6C, the second clutch 620 is located within the second pneumatic cylinder 120. Particularly, the second clutch 620 is located at the second end 504 of the second pneumatic cylinder 120 outside the chamber of the second cylindrical body 506. The second clutch 620 is configured to lock the second piston rod 512 after each impact stroke. The second clutch 620 may be operated pneumatically, hydraulically, mechanically, or a combination thereof. In an example, the second clutch 620 may include one or more friction ring members configured to engage the second piston rod 512 with the second cylindrical body 506 mechanically when the second piston rod 512 moves to cause one stroke. In some examples, the second clutch 620 may include one or more calipers which may be actuated pneumatically, hydraulically, or electronically to lock the second piston rod 512 after each stroke.

Referring to FIG. 1, FIG. 3, and FIG. 5, the first plurality of tubing 126 is configured to connect the source of compressed air 122 and the cap end port 308 of the first pneumatic cylinder 118 and the cap end port 508 of the second pneumatic cylinder 120. The second plurality of tubing 128 is configured to connect the source of compressed air 122 and the rod end port 310 of the first pneumatic cylinder 118 and the rod end port 510 of the second pneumatic cylinder 120. Particularly, the first T branch divider 130 is connected by the first tubing 126A to the source of compressed air 122, by the second tubing 126B to the cap end port 308 of the first pneumatic cylinder 118, and by the third tubing 126C to the cap end port 508 of the second pneumatic cylinder 120. Similarly, the second T branch divider 132 is connected by the fourth tubing 128A to the source of compressed air 122, by the fifth tubing 128B to the rod end port 310 of the first pneumatic cylinder 118 and by the sixth tubing 128C to the rod end port 510 of the second pneumatic cylinder 120.

Figure 7:
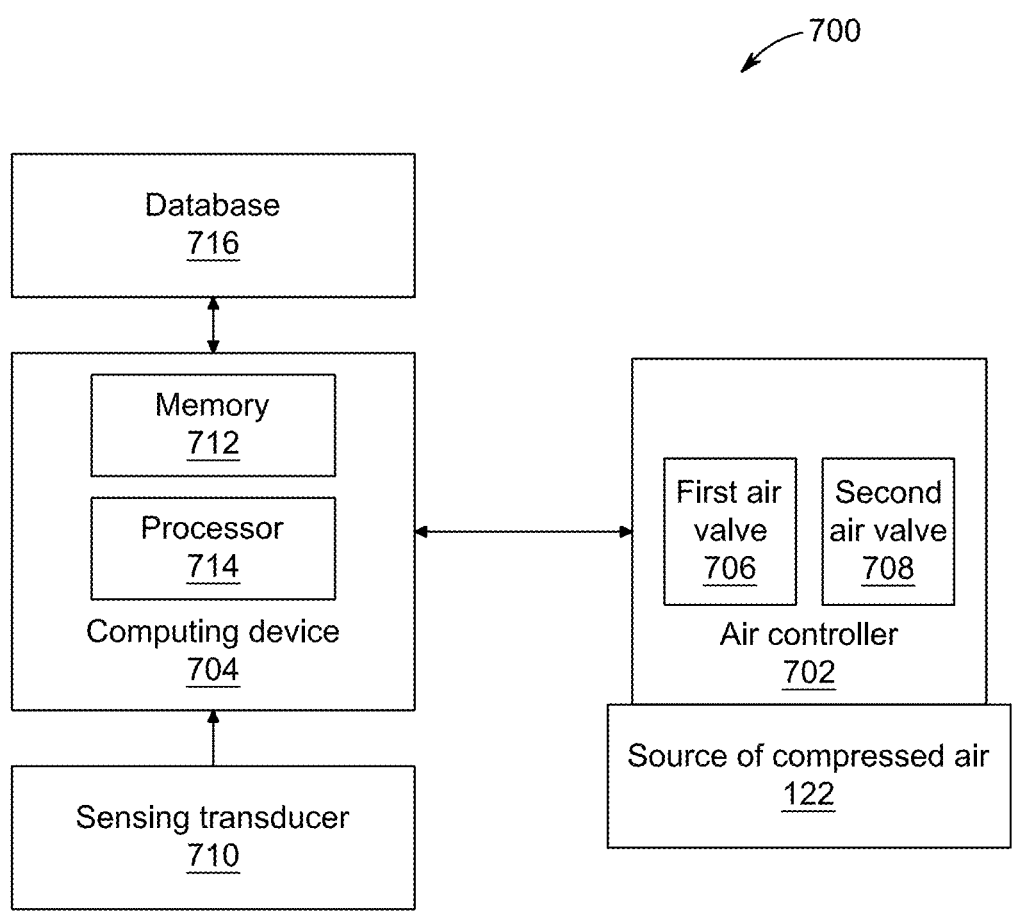
FIG. 7 is a schematic block diagram of a control system of the twin pneumatic hammer, according to certain embodiments.

Referring to FIG. 7, a schematic block diagram of a control system 700 operatively connected to the twin pneumatic hammer 100 is illustrated, according to an aspect of the present disclosure. The control system 700 is configured to actuate the first pneumatic hammer 102 and the second pneumatic hammer 104 to perform an impact stroke. The control system 700 is further configured to detect the ovalling mode in the cylindrical object during an implementation of the twin pneumatic hammer 100. The control system 700 of the twin pneumatic hammer 100 includes an air controller 702 in communication with the source of compressed air 122. The control system 700 further includes a computing device 704 connected to the air controller 702. Particularly, the computing device 704 is configured to trigger the impact stroke. Referring to FIG. 1 and FIG. 7, the air controller 702 is connected to the source of compressed air 122. The air controller 702 is further fluidly coupled to the plurality of tubing 124 to perform the impact stroke of the first hammer head 108 and the second hammer head 110 by controlling the release of compressed air into the plurality of tubing 124. The magnitude of a striking force and time lapse of contact during the impact stroke of the first hammer head 108 and the second hammer head 110 may be adjusted based on the elasticity of the materials used to form the hammer heads 108 and 110 and the type and material of the cylindrical being impacted. As the contact between the hammer heads 108 and 110 and the cylindrical object becomes harder, due to the hardness of the hammer materials and the material of the cylindrical object, the duration becomes shorter. Another consideration is the amount of air compressed into the first and second pistons 314, 514 before releasing the first and second hammer heads 108, 110. As the quantity of stored air increases, the impact stroke becomes more powerful, and hence the collision contact duration becomes longer. The quantity of air entering the first and second pneumatic cylinders 118, 120 may be determined by an air volume control apparatus which regulates the amount of air allowed into the chambers of first and second cylindrical bodies 306, 506.

In some aspects of the present disclosure, the air controller 702 includes a first air valve 706 configured to communicate with the first plurality of tubing 126 and a second air valve 708 configured to communicate with the second plurality of tubing 128. Particularly, the first tubing 126A of the first plurality of tubing 126 is fluidly coupled to the first air valve 706 and the fourth tubing 128A of the second plurality of tubing 128 is fluidly coupled to the second air valve 708. In one aspect of the present disclosure, the first air valve 706 and the second air valve 708 may be manual air control valves. Particularly, the first and second air valves 706, 708 may be actuated via a lever or a roller by an operator of the twin pneumatic hammer 100. In a non-limiting example, the first air valve 706 and the second air valve 708 may be actuated electrically, pneumatically or hydraulically based on an input from the operator. In another aspect of the present disclosure, the first air valve 706 and the second air valve 708 may be electronic control valves actuated by input signals received from the computing device 704. Upon actuation of the first air valve 706, the air controller 702 is configured to control the flow of the pressurized air flowing through the first plurality of tubing 126 and, thereby, control forward movements of the first piston rod 312 and the second piston rod 512 of the first pneumatic cylinder 118 and the second pneumatic cylinder 120, respectively, to create the impact stroke. Similarly, upon actuation of the second air valve 708, the air controller 702 is configured to control the flow of the pressurized air through the second plurality of tubing 128 and, thereby, control backward movements of the first piston rod 312 and the second piston rod 512 of the first pneumatic cylinder 118 and the second pneumatic cylinder 120, respectively.

According to an aspect of the present disclosure, during an implementation of the twin pneumatic hammer 100, the air controller 702 is configured to perform the impact stroke by simultaneously forcing the first piston rod 312 and the second piston rod 512 out of the first pneumatic cylinder 118 and the second pneumatic cylinder 120, respectively, and towards each other by increasing air pressure at each of the cap end ports 308 and 508. The air controller 702 further, simultaneously retracts the first piston rod 312 and the second piston rod 512 into the first pneumatic cylinder 118 and the second pneumatic cylinder 120, respectively, and away from each other by releasing air pressure through each of the cap end ports 308 and 508 while increasing air pressure at each of the rod end ports 310 and 510. The first and second hammer heads 108, 110 are designed in such a way that only one stroke is allowed for each test operation. Hence, once the first and second hammer heads 108, 110 are released and contacted the cylindrical object, the first and second piston rods 312, 512 are held immobile by the first and second clutches 420, 620, respectively. The first and second clutches 420, 620 prevent the first and second hammer heads 108, 110 from heading again towards the cylindrical object. The first and second clutches 420, 620 for the first and second hammer heads 108, 110, respectively, may also be used for controlling simultaneous release of the first and second hammer heads 108, 110 at each testing operation.

The control system 700 further includes a sensing transducer 710 configured to be in communication with the computing device 704. Further, the sensing transducer 710 is configured to attach with the cylindrical object at a position above a position of the cross sectional diagonal of the cylindrical object in a range of 5 cm to 20 cm. The sensing transducer 710 is further configured to sense vibrations in the cylindrical object and generate sensing signals when the cylindrical object is impacted by the twin pneumatic hammer 100. The computing device 704 further includes a memory 712 storing program instructions and at least one processor 714 configured to execute the program instructions. The program instructions are configured to trigger the air controller 702 to perform the impact stroke. The control system 700 further includes a database 716 to store records of other cylindrical objects, particularly, data pertain to a strength of other cylindrical objects determined using various laboratory tests and experimentation. The database 716 is also configured to store recorded response, after every testing operation, as a file in the format of sound (.wav), or any conversion of the format into numerical data, to analyze in the time-domain, or the frequency domain, for establishing physical characteristics of the ovalling modes of vibration in the cylindrical object.

Figure 8:
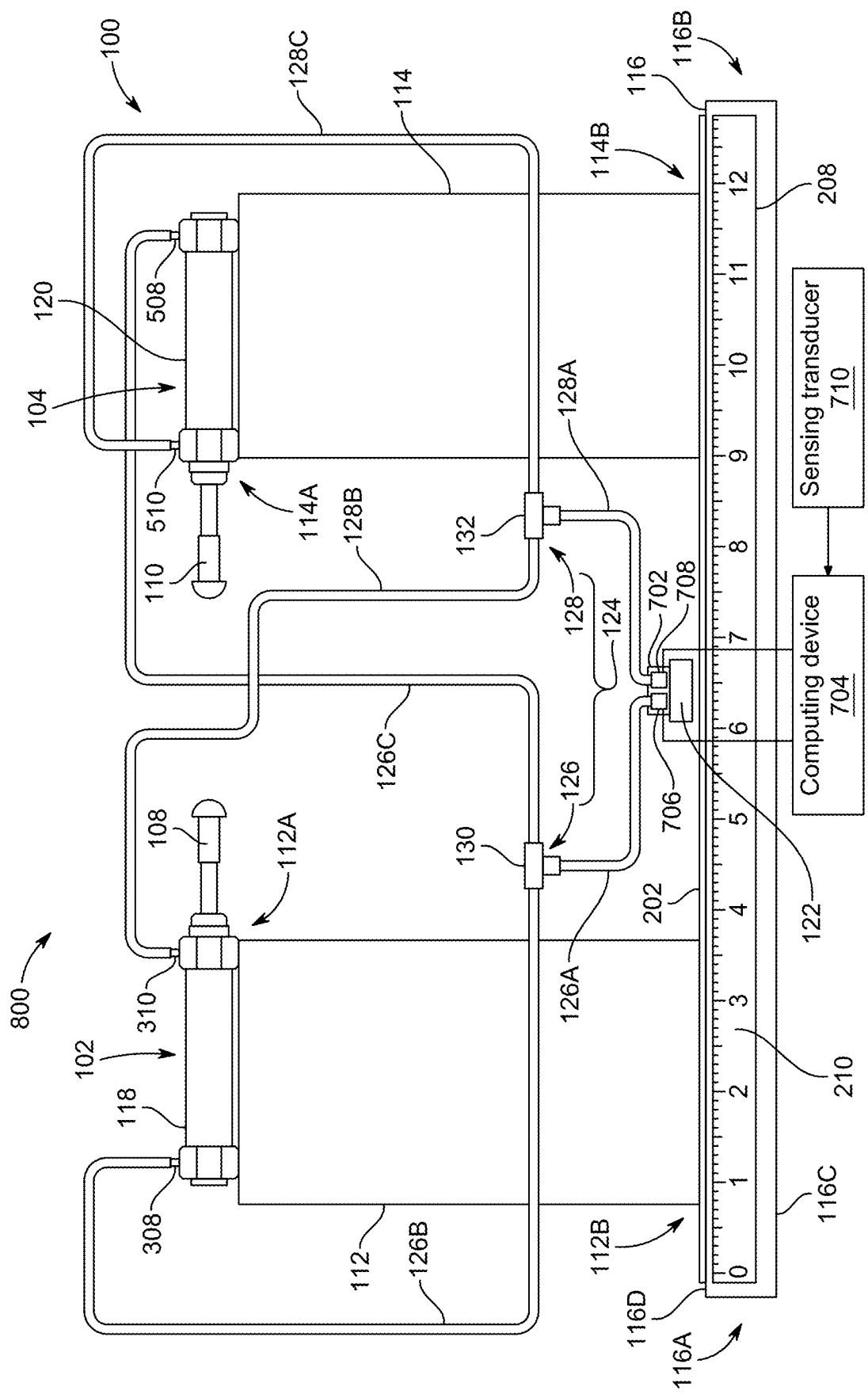
FIG. 8 is a schematic block diagram of a system for generating an ovalling mode in a cylindrical object, according to certain embodiments.

Referring to FIG. 8, a system 800 for generating the ovalling mode in the cylindrical object is illustrated, according to an aspect of the present disclosure. The system 800 includes the twin pneumatic hammer 100 described in detail herein above with reference to the FIG. 1 through FIG. 7. The twin pneumatic hammer 100 includes the first pneumatic hammer 102 and the second pneumatic hammer 104 supported on the first caliper arm 112 and the second caliper arm 114, respectively. The hammer head 108 of the first pneumatic hammer 102 is configured to face the hammer head 110 of the second pneumatic hammer 104 along the cross sectional diagonal of the cylindrical object. The angle between the longitudinal axis of the first caliper arm 112 and the axial line of the first pneumatic hammer 102 is maintained at 90 degrees in such a way that the first caliper arm 112 firmly supports the first pneumatic hammer 102. Similarly, the angle between the longitudinal axis of the second caliper arm 114 and the axial line of the second pneumatic hammer 104 is maintained at 90 degrees in such a way that the second caliper arm 114 firmly supports the second pneumatic hammer 104. The system 800 further includes the caliper base 116 slidably supporting the first caliper arm 112 and the second caliper arm 114 and the sliding track 202 disposed within the caliper base 116. The sliding track 202 is configured to slidingly hold the first caliper arm 112 and the second caliper arm 114 to the caliper base 116 such that the distance between the first caliper arm 112 and the second caliper arm 114 may be adjusted along the length of the caliper base 116. The system 800 further includes the ruler 208 located parallel to the sliding track 202 and the ruler 208 includes the markings 210 indicating the distance from the first caliper arm 112 to the second caliper arm 114. The system 800 further includes the source of compressed air 122 and the plurality of tubing 124 configured to connect the first pneumatic cylinder 118 of the first pneumatic hammer 102 and the second pneumatic cylinder 120 of the second pneumatic hammer 104 to the source of compressed air 122. The system 800 further includes the air controller 702 connected to the source of compressed air 122. The air controller 702 is configured to perform the impact stroke of the hammer heads 108 and 110 of each of the first pneumatic hammer 102 and the second pneumatic hammer 104, respectively, by controlling the release of the compressed air into the plurality of tubing 124.

Figure 9A:
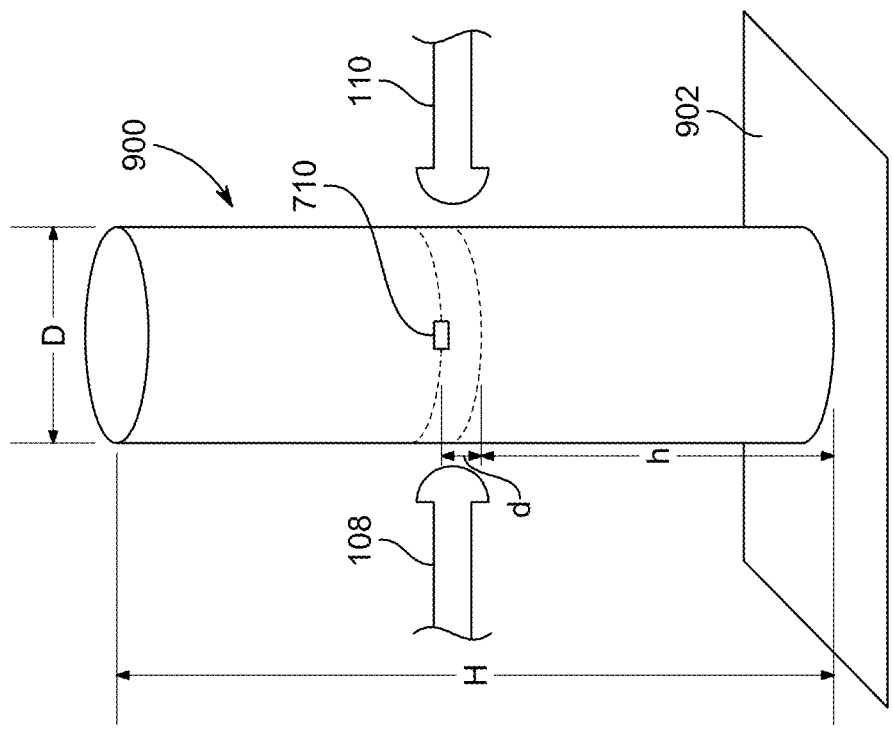
FIG. 9A is an exemplary illustration of impacting stroke on the cylindrical object using the twin pneumatic hammer to detect the ovalling mode, according to certain embodiments.
Figure 9B:
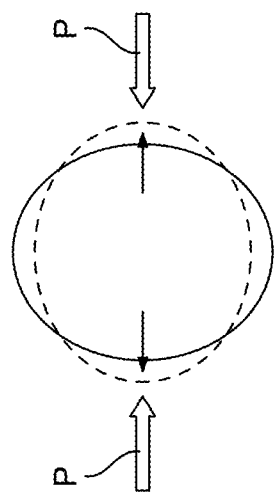
FIG. 9B is a diagrammatic representation of the ovalling mode of the cylindrical object, according to certain embodiments.

During an implementation of the twin pneumatic hammer 100, the hammer head 108 of the first pneumatic hammer 102 is aligned to face the hammer head 110 of the second pneumatic hammer 104 along the cross sectional diagonal of a cylindrical object 900, as shown in FIG. 9A. Referring to FIG. 9A, an exemplary illustration of impacting the stroke on the cylindrical object 900 to detect an ovalling mode thereof using a numerical simulation is illustrated, according to an aspect of the present disclosure. The cylindrical object 900 considered for the purpose of illustrating the ovalling mode, in accordance with an experimental set up of the present disclosure, is a circular cylinder having a height 'H' of 200 cm and a diameter 'D' of 25 cm. The material of the cylindrical object 900 was concrete with a modulus of elasticity (MOE) of about 3.0 GPa and a loss factor ($\eta$) of about 0.05. A numerical simulation for the response of the cylindrical object 900 was conducted using the multi-physics engineering simulation software, ANSYS. The cylindrical object 900 was held vertical and fastened at a bottom end thereof to a ground surface 902 to fulfill the boundary condition of "clamped" at the ground surface 902 and "free" at a top end thereof. The excitation pulse is given at a half-sine shaped signal of duration at $1 \cdot 10^{-4}$ seconds (s) and the magnitude of the force of impact at $1 \cdot 10^4$ Newton (N), as shown in FIG. 9B. In the cylindrical object 900, two points were selected at a height 'h' of 100 cm above the ground surface 902 along the cross sectional diagonal thereof. The two points were considered as the points for imparting the excitation pulse 'P'. The response of the cylindrical object 900 was sensed on a circle situated at a distance 'd' of about 10.0 cm above a plane of application of the excitation, that is 110 cm above the ground surface 902.

Referring to FIG. 7 through FIG. 9A, the system 800 further includes the sensing transducer 710 connected to the cylindrical object 900 at the position above the position of the cross sectional diagonal of the cylindrical object 900 in a range of 5 cm to 20 cm. Therefore, the position of the sensing transducer 710 was placed at the distance 'd' from the position of the cross sectional diagonal of the cylindrical object 900. The distance 'd' was in the range of 5 cm to 20 cm. As shown in FIG. 9A, the sensing transducer 710 was located on the cylindrical object 900 at the distance 'd' of 10 cm above the position of the cross sectional diagonal thereof.

The system 800 further includes the computing device 704 configured to be in communication with the air controller 702 and the sensing transducer 710. The computing device 704 further includes the memory 712 storing program instructions and the processor 714 configured to execute the program instructions. The program instructions are configured to trigger the air controller 702 to perform the impact stroke. Particularly, the computing device 704 provides instructions to the air controller 702 such that the first air valve 706 forces the first and second piston rods 312, 512 out of the first and second pneumatic cylinders 118, 120, respectively, by increasing air pressure at each of the cap end ports 308, 508 and retracts, via the second air valve 708, the first and second piston rods 312, 512 into the first and second pneumatic cylinders 118, 120, respectively, by releasing air pressure through each of the cap end ports 308, 508 while increasing air pressure at each of the rod end ports 310, 510. Upon excitation of the cylindrical object 900 using the twin pneumatic hammer 100, the sensing transducer 710 located in the cylindrical object 900 generates the sensing signals. The computing device 704 is further provided with the instructions to receive the sensing signals and store the sensing signals in the memory 712. The computing device 704 further receives instructions from the processor 714 to analyze the sensing signals and thereby to detect the ovalling mode of the cylindrical object 900 and match the ovalling mode to known characteristics of cylindrical objects related to each ovalling mode as stored in the database 716.

Figure 10A:
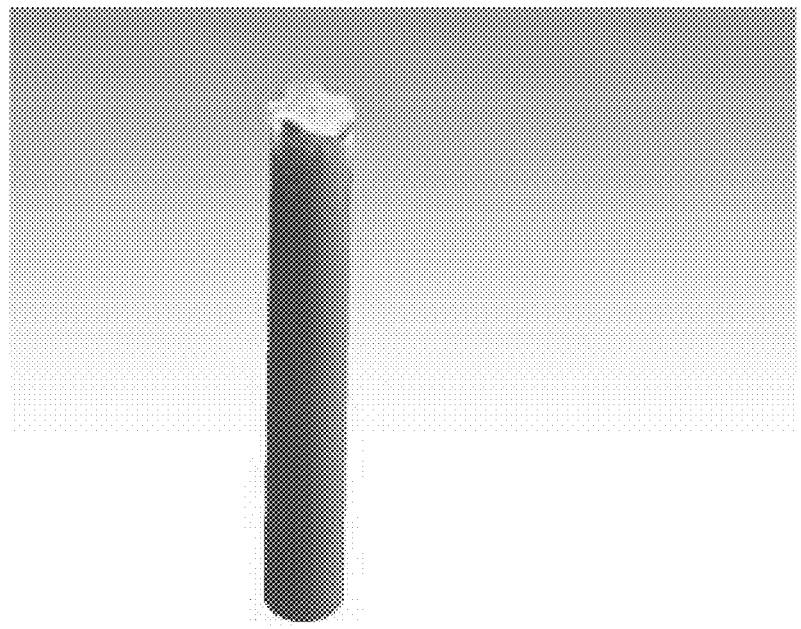
FIG. 10A illustrates a three dimensional numerical simulation for detecting an ovalling mode in a clamped-free solid concrete cylinder, according to certain embodiments.

Referring to FIG. 10A, a three dimensional (3D) numerical simulation for detecting an ovalling mode in a clamped-free solid concrete cylinder is illustrated, according to an aspect of the present disclosure. The results from running the numerical simulation for the solid cylinder and an excitation resulting from the action of the twin pneumatic hammer 100 are summarized in file sequences packed in a first data storage form and a second data storage form. According to the numerical calculations performed by ANSYS, the frequency of the ovalling mode was determined at 5186 Hz, and the ovalling mode was ranked as nr 51 in the frequency scale, which encompasses all possible modes of vibrations including the types of axial, bending, torsional and cross-sectional. The first data storage form shows the behavior of the vibrational mode in its entirety with an emphasis of the behavior of the upper circular free surface-end of the clamped solid cylinder. The second data storage form shows details over the vibrational deformation of the cylinder on a plane normal to the axis at the distance 'd' of 10.0 cm from a plane of application of the double-pulse excitation.

Figure 10B:
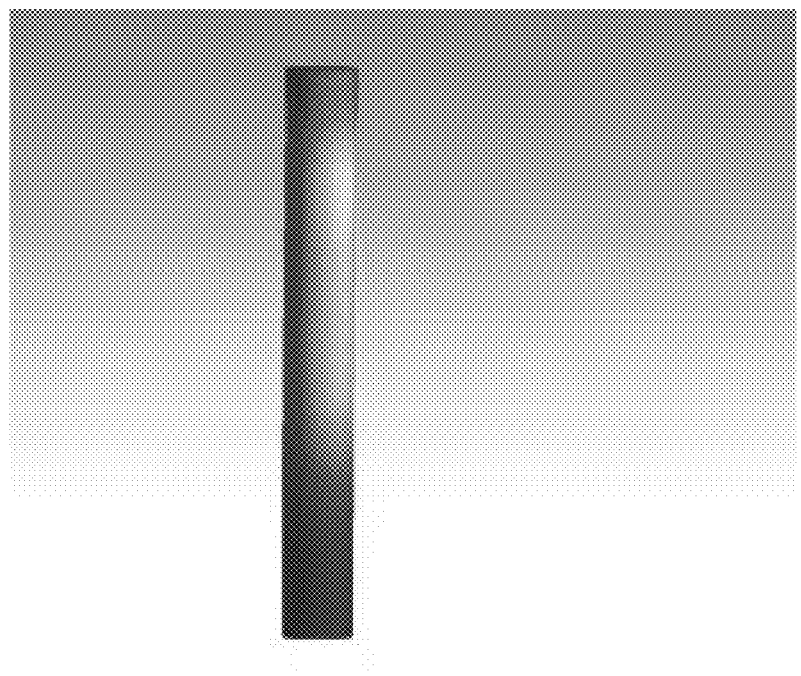
FIG. 10B illustrates a three dimensional numerical simulation of a clamped-free solid concrete cylinder responding to a longitudinal mode of vibration at around f=25 Hz when a length of the cylinder is ¼ wavelength, according to certain embodiments.
Figure 10C:
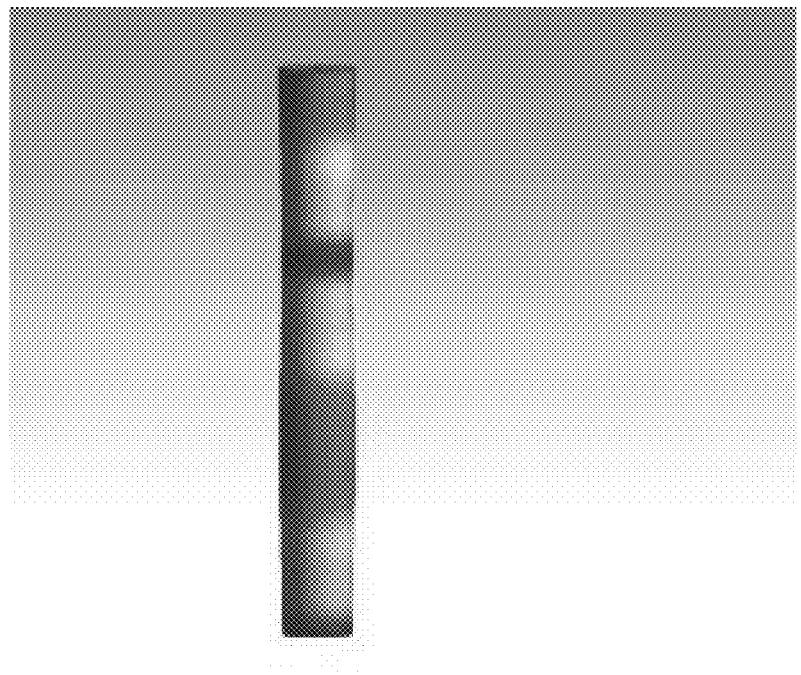
FIG. 10C illustrates a three dimensional numerical simulation of the clamped-free solid concrete cylinder responding to a longitudinal mode of vibration at around f=130 Hz when a length of the cylinder is ⅝ wavelength, according to certain embodiments.
Figure 10D:
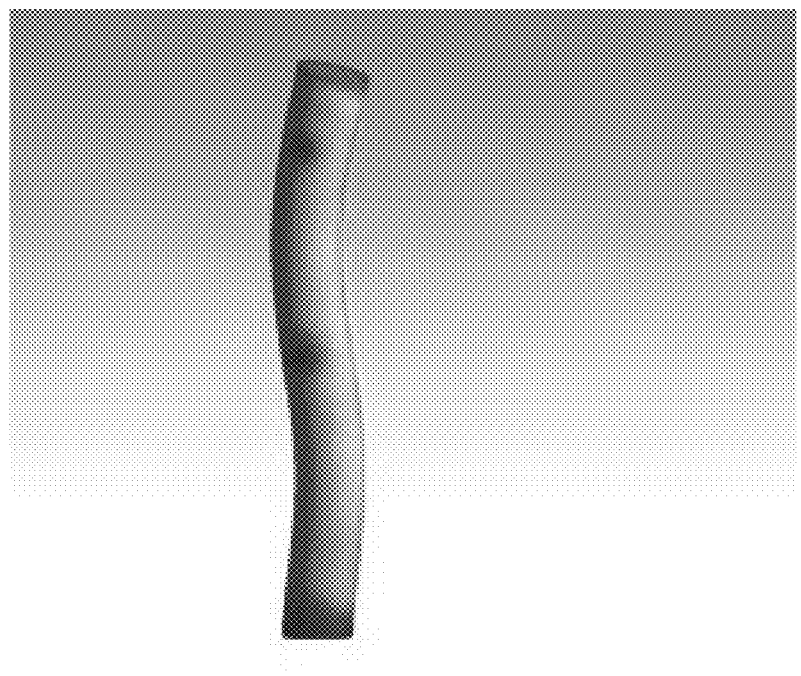
FIG. 10D illustrates a three dimensional numerical simulation of the clamped-free solid concrete cylinder responding to 7th mode of vibration corresponding to a second lowest bending mode of vibration at f=400 Hz, according to certain embodiments.

Modes of vibrations other than the cross-sectional type or the ovalling mode vibrations are illustrated in FIG. 10B, FIG. 10C and FIG. 10D. FIG. 10B illustrates the 3D numerical simulation of a clamped-free solid concrete cylinder responding to a longitudinal mode of vibration at around f=25 Hz when a length of the cylinder was ¼ wavelength. FIG. 10C illustrates the 3D numerical simulation of the clamped-free solid concrete cylinder responding to the longitudinal mode of vibration at around f=130 Hz when a length of the cylinder was ⅝ wavelength. FIG. 10D illustrates a 3D numerical simulation of the clamped-free solid concrete cylinder responding to $7^{th}$ mode of vibration corresponding to a second lowest bending mode of vibration at f=400 Hz.

Figure 11:
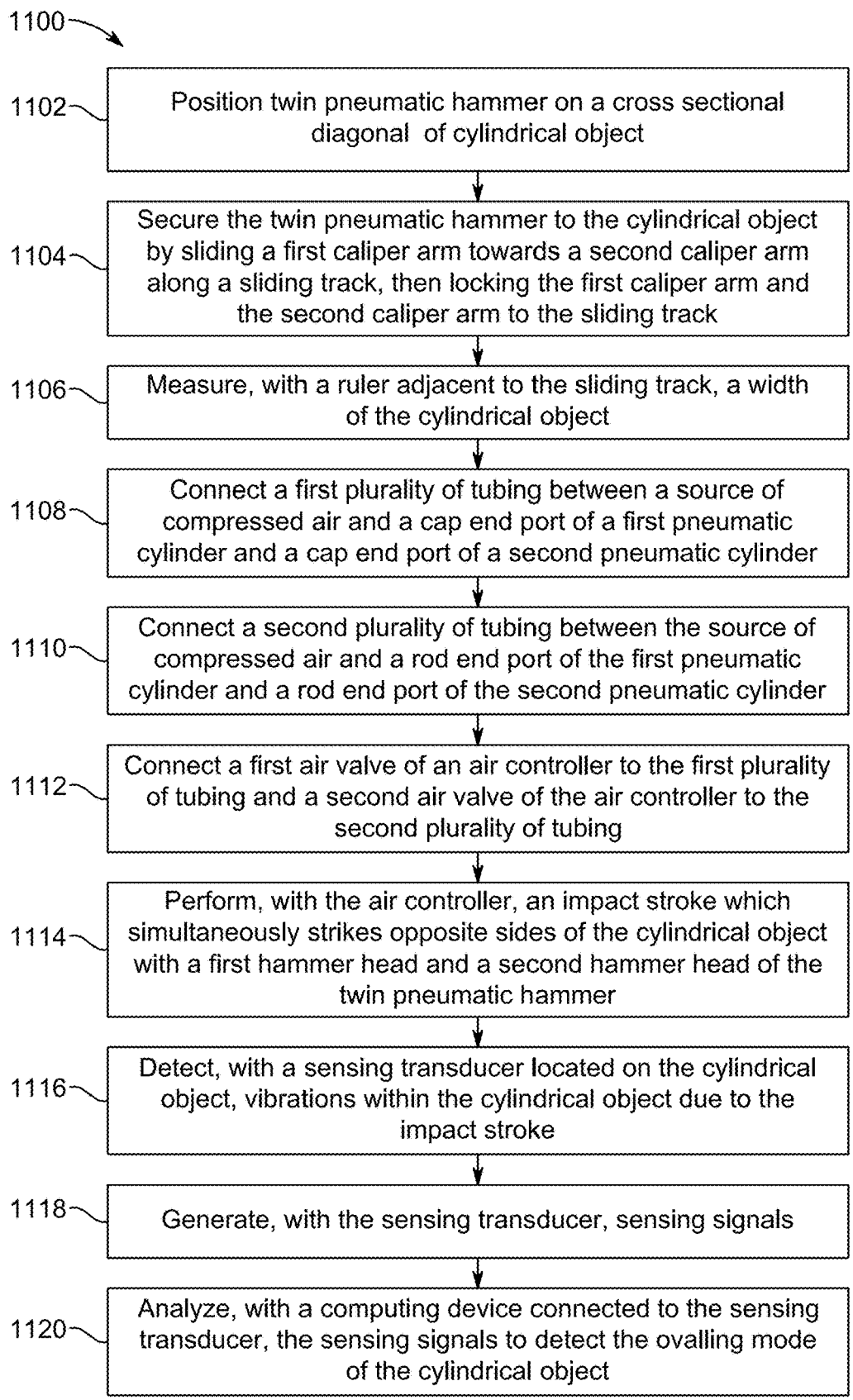
FIG. 11 is an exemplary flowchart of a method for using the twin pneumatic hammer to detect the ovalling mode in the cylindrical object, according to certain embodiments.

FIG. 11 illustrates a flowchart of a method 1100 for using the twin pneumatic hammer 100 to detect the ovalling mode in the cylindrical object. The method 1100 is described with reference to FIG. 1 through FIG. 9B. At step 1102, the method 1100 includes positioning the twin pneumatic hammer 100 on the cross sectional diagonal of the cylindrical object. During an implementation of the twin pneumatic hammer 100, according to the present disclosure, the first hammer head 108 of the first pneumatic hammer 102 and the second hammer head 110 of the second pneumatic hammer 104 are aligned to bring the axial lines of the first pneumatic hammer 102 and the second pneumatic hammer 104 coaxial. Further, two points are defined in the cylindrical object along the cross sectional diagonal thereof. Preferably, the two points may be defined at a center of the cylindrical object along the height 'H' thereof. In some aspects, the two points may be defined at any distance between a top end and a bottom end of the cylindrical object. As shown in FIG. 9A, the hammer head 108, 110 of each of the first pneumatic hammer 102 and the second pneumatic hammer 104 are positioned at the two points defined in the cylindrical object.

At step 1104, the method 1100 includes securing the twin pneumatic hammer 100 to the cylindrical object by sliding the first caliper arm 112 towards the second caliper arm 114 along the sliding track 202. The method 1100 further includes locking the first caliper arm 112 and the second caliper arm 114 to the sliding track 202. Upon positioning the twin pneumatic hammer 100 on the cross sectional diagonal of the cylindrical object, the first caliper arm 112 and the second caliper arm 114 are moved towards each other using the sliding track 202. Particularly, the rack 206 attached to each of the first and second caliper arms 112, 114 may be moved relative to the rail 204 mounted on the caliper base 116 based on a diameter of the cylindrical object. Upon positioning the first caliper arm 112 and the second caliper arm 114, the locking mechanism 212 is used to lock the position of the first and second caliper arms 112, 114 on the caliper base 116 at the positioning distance. The positioning distance may correspond to the diameter of the cylindrical object.

At step 1106, the method 1100 includes measuring, with the ruler 208 adjacent to the sliding track 202, a width of the cylindrical object. Upon locking the position of the first and second caliper arms 112, 114 on the caliper base 116, the ruler 208 disposed parallel to the sliding track 202 is used to measure the width, which is otherwise referred to as the diameter, of the cylindrical object. The ruler 208 may also help the operator of the twin pneumatic hammer 100 to align and position the first caliper arm 112 and the second caliper arm 114 quickly and precisely based on a size of the cylindrical object. This measurement may be input by an operator to a computer interface of the computing device 704.

At step 1108, the method 1100 includes connecting the first plurality of tubing 126 between the source of compressed air 122 and the cap end port 308 of the first pneumatic cylinder 118 and the cap end port 508 of the second pneumatic cylinder 120. Upon positioning the cylindrical object in the twin pneumatic hammer 100 and measuring the dimensional specifications of the cylindrical object and the positioning distance, the first plurality of tubing 126 is connected between the source of compressed air 122 and the cap end ports 308 of the first and second pneumatic cylinders 118, 120 using the first T branch divider 130. Particularly, the first T branch divider 130 is connected to the source of compressed air 122 using the first tubing 126A, to the cap end port 308 of the first pneumatic cylinder 118 using the second tubing 126B, and to the cap end port 508 of the second pneumatic cylinder 120 using the third tubing 126C.

Similarly, at step 1110, the method 1100 includes connecting the second plurality of tubing 128 between the source of compressed air 122 and the rod end port 310 of the first pneumatic cylinder 118 and the rod end port 510 of the second pneumatic cylinder 120. The second plurality of tubing 128 is connected between the source of compressed air 122 and the rod end ports 310 and 510 of the first and second pneumatic cylinders 118, 120 using the second T branch divider 132. Particularly, the second T branch divider 132 is connected to the source of compressed air 122 using the fourth tubing 128A, to the rod end port 310 of the first pneumatic cylinder 118 using the fifth tubing 128B, and to the rod end port 510 of the second pneumatic cylinder 120 using the sixth tubing 128C.

At step 1112, the method 1100 includes connecting the first air valve 706 of the air controller 702 to the first plurality of tubing 126 and the second air valve 708 of the air controller 702 to the second plurality of tubing 128. Particularly, the first tubing 126A of the of the first plurality of tubing 126 and the fourth tubing 128A of the second plurality of tubing 128 are connected to the first air valve 706 and the second air valve 708, respectively, which are in turn communicate with the source of compressed air 122.

At step 1114, the method 1100 includes performing, with the air controller 702, the impact stroke which simultaneously strikes opposite sides of the cylindrical object with the first hammer head 108 and the second hammer head 110 of the twin pneumatic hammer 100. In an aspect of the present disclosure, the impact stroke is performed by opening, by the air controller 702, the first air valve 706 to inject the compressed air into each of the cap end ports 308 and 508 to simultaneously extend the first piston rod 312 and the second piston rod 512 out of the first pneumatic cylinder 118 and the second pneumatic cylinder 120, respectively, towards each other. Further, the first air valve 706 is closed by the air controller 702 and the second air valve 708 is opened by the air controller 702 to inject the compressed air into each of the rod end ports 310 and 510 to simultaneously retract the first piston rod 312 and the second piston rod 512 into the first pneumatic cylinder 118 and the second pneumatic cylinder 120, respectively, and away from each other. In one aspect of the present disclosure, the air controller 702 including the first air valve 706 and the second air valve 708 may be actuated manually by the operator of the twin pneumatic hammer 100 to perform the impact stroke. In another aspect of the present disclosure, the method 1100 includes connecting the air controller 702 to the computing device 704 and triggering the impact stroke by controlling the first air valve 706 and the second air valve 708 of the air controller 702 using the computing device 704. The computing device 704 disposed in communication with the first and second air valves 706, 708 of the air controller 702 may provide input signals to electrically actuate the first and second air valves 706, 708. Particularly, the program instructions stored in the memory 712 of the computing device 704 may be executed by the processor 714 to trigger the air controller 702 to perform the impact stroke.

At step 1116, the method 1100 includes detecting, with the sensing transducer 710 located on the cylindrical object, vibrations in the cylindrical object due to the impact stroke. The sensing transducer 710 is located on the cylindrical object at the position above the position of the cross sectional diagonal of the cylindrical object in the range of 5 cm to 20 cm. Upon triggering the impact stroke on the cylindrical object, the cylindrical object may experience the ovalling mode vibration, as shown in FIG. 9B, and the vibration is sensed by the sensing transducer 710. Upon sensing the vibration, at step 1118, the method 1100 includes generating the sensing signals with the sensing transducer 710. Further, the sensing transducer 710 disposed in communication with the computing device 704 communicates the sensing signals with the computing device 704. Upon receiving the sensing signals by the computing device 704, at step 1120, the method 1100 includes analyzing the sensing signals to detect the ovalling mode of the cylindrical object with the help of the computing device 704.

In one aspect of the present disclosure, the method 1100 includes connecting the sensing transducer 710 to the cylindrical object at the position in the range of 5 cm to 20 cm above the position of the cross sectional diagonal of the cylindrical object and connecting the sensing transducer 710 to the computing device 704. The method 1100 further includes triggering the air controller 702 by the computing device 704 to perform the impact stroke and receiving the sensing signals indicative of the ovalling mode vibration from the sensing transducer 710. The method 1100 further includes storing the sensing signals in the memory 712 of the computing device 704. The stored signals may be used for further analysis and to detect the ovalling mode of the cylindrical object.

In another aspect of the present disclosure, the method 1100 includes connecting the sensing transducer 710 to the cylindrical object at the position in the range of 5 cm to 20 cm above the position of the cross sectional diagonal of the cylindrical object and connecting the sensing transducer 710 to the computing device 704. The computing device 704 triggers the air controller 702 to perform the impact stroke and receives the sensing signals. The sensing signals is analyzed by the computing device 704 to detect the ovalling mode. The method 1100 further includes determining, by the computing device 704, a strength of the cylindrical object by matching an amplitude and frequency of the ovalling mode to the database 716 storing records of cylindrical objects with strengths of the cylindrical objects. Particularly, the database 716 may include a historical data related to a strength of various cylindrical objects obtained from lab test or various experimental results. The amplitude and frequency of the ovalling mode vibration may be compared with the historical data to determine the strength of the cylindrical object.

The first embodiment of the present disclosure is illustrated with respect to FIG. 1 through FIG. 9B. The first embodiment describes the twin pneumatic hammer 100. The twin pneumatic hammer 100, comprising: the first caliper arm 112; the first hammer head 108 connected to the first pneumatic cylinder 118, wherein the first pneumatic cylinder 118 is mounted on the first caliper arm 112; the second caliper arm 114; the second hammer head 110 connected to the second pneumatic cylinder 120, wherein the second pneumatic cylinder 120 is mounted on the second caliper arm 114, wherein the second hammer head 110 is positioned opposite to and facing the first hammer head 108; the caliper base 116; the sliding track 202 within the caliper base 116, wherein the sliding track 202 is configured to slidingly hold the first caliper arm 112 and the second caliper arm 114 to the caliper base 116 such that the distance between the first caliper arm 112 and the second caliper arm 114 may be adjusted along the length of the caliper base 116; the ruler 208 located parallel to the sliding track 202, wherein the ruler 208 includes the markings 210 indicating the distance from the first caliper arm 112 to the second caliper arm 114; the source of compressed air 122; the plurality of tubing 124 configured to connect the first pneumatic cylinder 118 and the second pneumatic cylinder 120 to the source of compressed air 122; and the air controller 702 connected to the source of compressed air 122, wherein the air controller 702 is configured to perform the impact stroke of the first hammer head 108 and the second hammer head 110 by controlling the release of compressed air into the plurality of tubing 124.

In an aspect, the twin pneumatic hammer 100 further comprising the first piston rod 312 located within the first pneumatic cylinder 118; the second piston rod 512 located within the second pneumatic cylinder 120; the cap end port 308, 508 located at the first end 302, 502 of each pneumatic cylinder 118, 120; the first piston 314 connected to the cap end 312A of the first piston rod 312; the rod end port 308, 310 located at the second end 304, 504 of each pneumatic cylinder 118, 120; and the second piston 514 connected to the cap end 512A of the second piston rod 512, wherein the first hammer head 108 is connected to the rod end 312B of the first piston rod 312 and the second hammer head 110 is connected to the rod end 512B of the second piston rod 512.

In an aspect, the twin pneumatic hammer 100 further comprising the first T branch divider 130 connected by the first tubing 126A to the source of compressed air 122, by the second tubing 126B to the cap end port 308 of the first pneumatic cylinder 118 and by the third tubing 126C to the cap end port 508 of the second pneumatic cylinder 120; and the second T branch divider 132 connected by the fourth tubing 128A to the source of compressed air 122, by the fifth tubing 128B to the rod end port 310 of the first pneumatic cylinder 118 and by the sixth tubing 128C to the rod end port 510 of the second pneumatic cylinder 120.

In an aspect of the twin pneumatic hammer 110, the length of the first tubing 126A equals the length of the fourth tubing 128A; the length of the second tubing 126B equals the length of the third tubing 126C; and the length of the fifth tubing 128B equals the length of the sixth tubing 128C.

In an aspect of the twin pneumatic hammer 100, the cap end port 308 of the first pneumatic cylinder 118 is connected to the second tubing 126B; the cap end port 508 of the second pneumatic cylinder 120 is connected to the third tubing 126C; wherein the air controller 702 is further configured to perform the impact stroke by simultaneously forcing the first piston rod 312 and the second piston rod 512 out of the first pneumatic cylinder 118 and the second pneumatic cylinder 120, respectively, and towards each other by increasing air pressure at each of the cap end ports 308 and 508, then simultaneously retracting the first piston rod 312 and the second piston rod 512 into the first pneumatic cylinder 118 and the second pneumatic cylinder 120, respectively, and away from each other by releasing air pressure through each of the cap end ports 308 and 508 while increasing air pressure at each of the rod end ports 310 and 510.

In an aspect, the twin pneumatic hammer 100 further comprising the computing device 704 connected to the air controller 702, wherein the computing device 704 is configured to trigger the impact stroke.

In an aspect, the twin pneumatic hammer 100 further comprising the male threads 402 formed in the rod end 312B of the first piston rod 312; the female threads 410 formed in the connection port 408 of the first hammer head 108, wherein the male threads 402 and the female threads 410 are configured to connect the first hammer head 108 to the rod end 312B of the first piston rod 312; the male threads 602 formed in the rod end 512B of the second piston rod 512; and the female threads 610 formed in the connection port 608 of the second hammer head 110, wherein the male threads 602 and the female threads 610 are configured to connect the second hammer head 110 to the rod end 512B of the second piston rod 512.

In an aspect of the twin pneumatic hammer 100, the first hammer head 108A is connected by the welding to the rod end 312B of the first piston rod 312 and the second hammer head 110A is connected by the welding to the rod end 512B of the second piston rod 512.

In an aspect, the twin pneumatic hammer 100 further comprising the first clutch 420 located within the first pneumatic cylinder 118, wherein the first clutch 420 is configured to lock the first piston rod 312 after each impact stroke; and the second clutch 620 located within the second pneumatic cylinder 120, wherein the second clutch 620 is configured to lock the second piston rod 512 after each impact stroke.

In an aspect of the twin pneumatic hammer 100, the source of compressed air 122 is one of the air cannister and the portable air compressor.

In an aspect, the twin pneumatic hammer 100 further comprising the locking mechanism 212 connected to the sliding track 202, wherein the locking mechanism 212 is configured to lock the first caliper arm 112 and the second caliper arm 114 at the positioning distance.

The second embodiment of the present disclosure is illustrated with respect to FIG. 1 through FIG. 11. The second embodiment describes the method 1100 for using the twin pneumatic hammer 100 to detect the ovalling mode in a cylindrical object. The method 1100 comprising positioning the twin pneumatic hammer 100 on the cross sectional diagonal of the cylindrical object; securing the twin pneumatic hammer 100 to the cylindrical object by sliding the first caliper arm 112 towards the second caliper arm 114 along the sliding track 202 then locking the first caliper arm 112 and the second caliper arm 114 to the sliding track 202; measuring, with the ruler 208 adjacent to the sliding track 202, the width of the cylindrical object; connecting the first plurality of tubing 126 between the source of compressed air 122 and the cap end port 308 of the first pneumatic cylinder 118 and the cap end port 508 of the second pneumatic cylinder 120; connecting the second plurality of tubing 128 between the source of compressed air 122 and the rod end port 310 of the first pneumatic cylinder 118 and the rod end port 510 of the second pneumatic cylinder 120; connecting the first air valve 706 of the air controller 702 to the first plurality of tubing 126 and the second air valve 708 of the air controller 702 to the second plurality of tubing 128; performing, with the air controller 702, the impact stroke which simultaneously strikes opposite sides of the cylindrical object with the first hammer head 108 and the second hammer head 110 of the twin pneumatic hammer 100; detecting, with the sensing transducer 710 located on the cylindrical object, vibrations within the cylindrical object due to the impact stroke; generating, with the sensing transducer, sensing signals; and analyzing, with the computing device 704 connected to the sensing transducer 710, the sensing signals to detect the ovalling mode of the cylindrical object.

In an aspect, the method 1100 comprising performing the impact stroke by opening, by the air controller 702, the first air valve 706 to inject the compressed air into each of the cap end ports 308 and 508 to simultaneously extend the first piston rod 312 and the second piston rod 512 out of the first pneumatic cylinder 118 and the second pneumatic cylinder 120, respectively, towards each other; then closing, by the air controller 702, the first air valve 706; and then opening, by the air controller 702, the second air valve 708 to inject the compressed air into each of the rod end ports 310 and 510 to simultaneously retract the first piston rod 312 and the second piston rod 512 into the first pneumatic cylinder 118 and the second pneumatic cylinder 120, respectively, and away from each other.

In an aspect, the method 1100 further comprising connecting the air controller 702 to the computing device 704; and triggering the impact stroke by controlling, by the computing device 704, the first air valve 706 and the second air valve 708 of the air controller 702.

In an aspect, the method 1100 further comprising connecting the sensing transducer 712 to the cylindrical object at the position in the range of 5 cm to 20 cm above the position of the cross sectional diagonal of the cylindrical object; connecting the sensing transducer 710 to the computing device 704; triggering, by the computing device 704, the air controller 702 to perform the impact stroke; receiving, by the computing device 704, the sensing signals; analyzing, by the computing device 704, the sensing signals to detect the ovalling mode; and determining, by the computing device 704, the strength of the cylindrical object by matching the amplitude and frequency of the ovalling mode to the database storing records of cylindrical objects with strengths of the cylindrical objects.

In an aspect, the method 1100 further comprising connecting the sensing transducer 710 to the cylindrical object at the position in the range of 5 cm to 20 cm above the position of the cross sectional diagonal of the cylindrical object; connecting the sensing transducer 710 to the computing device 704; triggering, by the computing device 704, the air controller 702 to perform the impact stroke; receiving, by the computing device 704, the sensing signals from the sensing transducer 710 generated by the impact stroke; and storing, in the memory 712 of the computing device, the sensing signals.

The third embodiment of the present disclosure is illustrated with respect to FIG. 1 through FIG. 9B. The third embodiment describes the system 800 for generating the ovalling mode in the cylindrical object. The system 800 comprising the twin pneumatic hammer 100 including the first pneumatic hammer 102 and the second pneumatic hammer 104, wherein the hammer head 108 of the first pneumatic hammer 102 is configured to face the hammer head 110 of the second pneumatic hammer 104 along the cross sectional diagonal of the cylindrical object; the first caliper arm 112 configured to support the first pneumatic hammer 102, wherein the angle between the longitudinal axis of the first caliper arm 112 and the axial line of the first pneumatic hammer 102 is 90 degrees; the second caliper arm 114 configured to support the second pneumatic hammer 104, wherein the angle between the longitudinal axis of the second caliper arm 114 and the axial line of the second pneumatic hammer 104 is 90 degrees; the caliper base 116; the sliding track 202 within the caliper base 116, wherein the sliding track 202 is configured to slidingly hold the first caliper arm 112 and the second caliper arm 114 to the caliper base 116 such that the distance between the first caliper arm 112 and the second caliper arm 114 may be adjusted along the length of the caliper base 116; the ruler 208 located parallel to the sliding track 202, wherein the ruler 208 includes the markings 210 indicating the distance from the first caliper arm 112 to the second caliper arm 114; the source of compressed air 122; the plurality of tubing 124 configured to connect the first pneumatic cylinder 118 of the first pneumatic hammer 102 and the second pneumatic cylinder 120 of the second pneumatic hammer 104 to the source of compressed air 122; the air controller 702 connected to the source of compressed air 122, wherein the air controller 702 is configured to perform the impact stroke of the hammer heads 108 and 110 of each of the first pneumatic hammer 102 and the second pneumatic hammer 104 by controlling the release of compressed air into the plurality of tubing 124; the sensing transducer 710 configured to be attached to the cylindrical object, wherein the sensing transducer 710 is configured to sense vibrations in the cylindrical object and generate the sensing signals; the computing device 704 connected to the air controller 702 and the sensing transducer 710, wherein the computing device 704 includes the memory 712 storing program instructions and the at least one processor 714 configured to execute the program instructions, wherein the program instructions are configured to trigger the air controller 702 to perform the impact stroke; receive the sensing signals; store the sensing signals in the memory 712; and analyze the sensing signals to detect the ovalling mode of the cylindrical object.

In an aspect, the system 800 further comprising the first piston rod 312 located within the first pneumatic cylinder 118; the second piston rod 512 located within the second pneumatic cylinder 120; the cap end port 308, 508 located at the first end 302, 502 of each pneumatic cylinder 118, 120; the first piston 314 connected to the cap end 312A of the first piston rod 312; the rod end port 310, 510 located at the second end 304, 504 of each pneumatic cylinder 118, 120, the second piston 514 connected to the cap end 512A of the second piston rod 512, wherein the hammer head 108 of the first pneumatic hammer 102 is connected to the rod end 312B of the first piston rod 312 and the hammer head 110 of the second pneumatic hammer 104 is connected to the rod end 512B of the second piston rod 512.

In an aspect, the system 800 further comprising the first T branch divider 130 connected by the first tubing 126A to the source of compressed air 122, by the second tubing 126B to the cap end port 308 of the first pneumatic cylinder 118 and by the third tubing 126C to the cap end port 508 of the second pneumatic cylinder 120; and the second T branch divider 132 connected by the fourth tubing 128A to the source of compressed air 122, by the fifth tubing 128B to the rod end port 310 of the first pneumatic cylinder 118 and by the sixth tubing 128C to the rod end port 510 of the second pneumatic cylinder 120.

In an aspect, the system 800 further comprising the first air valve 706 connected between the source of compressed air 122 and the first tubing 126A; the second air valve 708 connected between the source of compressed air 122 and the fourth tubing 128A; the first clutch 420 located within the first pneumatic cylinder 118, wherein the first clutch 420 is configured to lock the first piston rod 312 after each impact stroke; the second clutch 620 located within the second pneumatic cylinder 120, wherein the second clutch 620 is configured to lock the second piston rod 512 after each impact stroke; and wherein the air controller 702 is further configured to perform the impact stroke by simultaneously forcing the first piston rod 312 and the second piston rod 512 out of the first pneumatic cylinder 118 and the second pneumatic cylinder 120, respectively, and towards each other by increasing air pressure at each of the cap end ports 308 and 508, then simultaneously retracting the first piston rod 312 and the second piston rod 512 into the first pneumatic cylinder 118 and the second pneumatic cylinder 120, respectively, and away from each other by releasing air pressure from each of the cap end ports 308 and 508 while increasing air pressure at each of the rod end ports 310 and 510.

Figure 12:
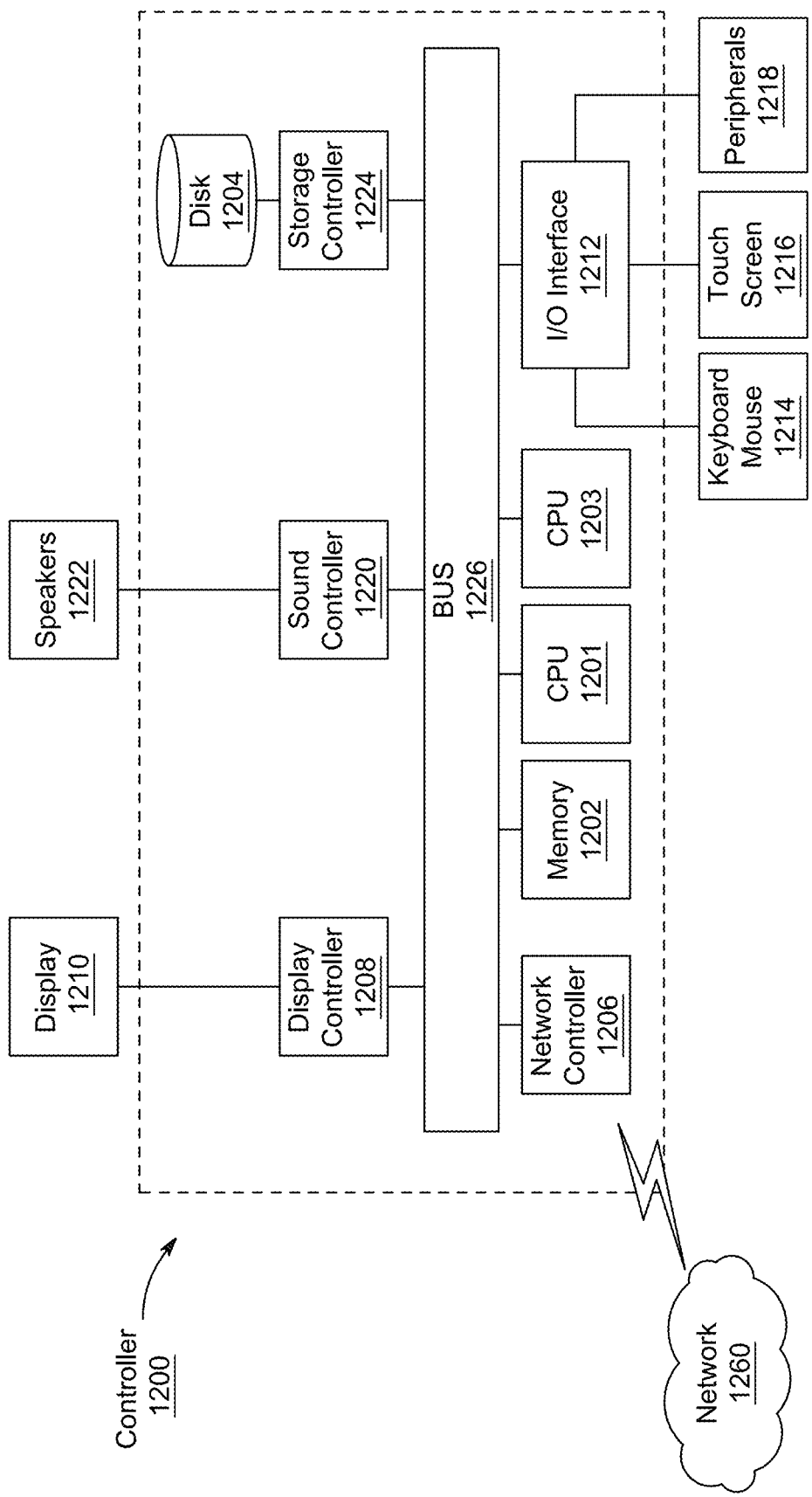
FIG. 12 is an illustration of a non-limiting example of details of computing hardware used in a computing device of the control system, according to certain embodiments.

Next, further details of the hardware description of the computing environment according to exemplary embodiments is described with reference to FIG. 12. In FIG. 12, a controller 1200 is described which is representative of the control system 700 of FIG. 7 in which the computing device 704 includes a CPU 1201 which performs the processes described above/below. The process data and instructions may be stored in memory 1202. These processes and instructions may also be stored on a storage medium disk 1204 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1201, 1203 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skill in the art would recognize. Further, CPU 1201, 1203 may be implemented as multiple processors cooperatively working in parallel to perform the instructions of the inventive processes described above.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 13:
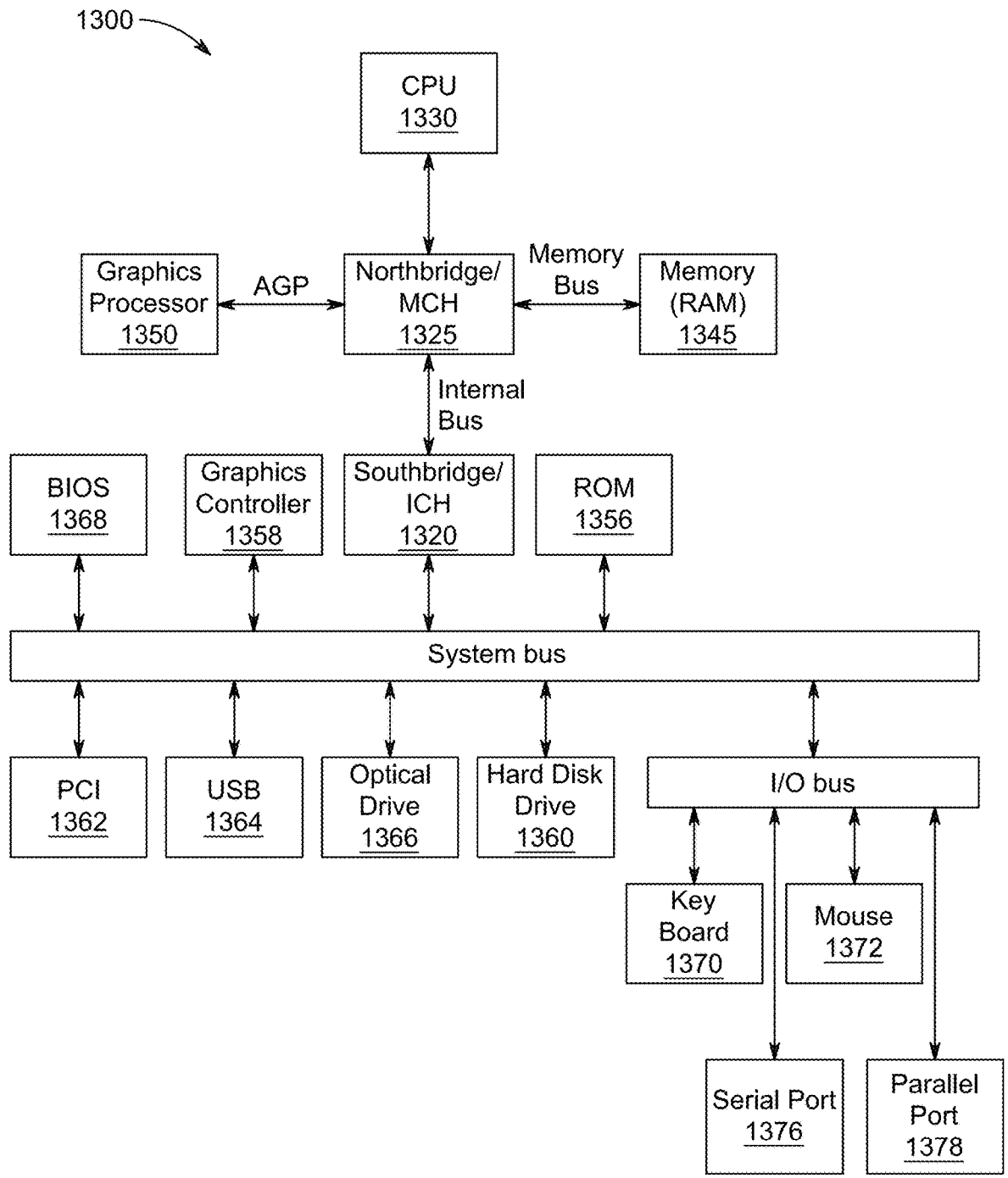
FIG. 13 is an exemplary schematic diagram of a data processing system used within the computing device, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus, and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
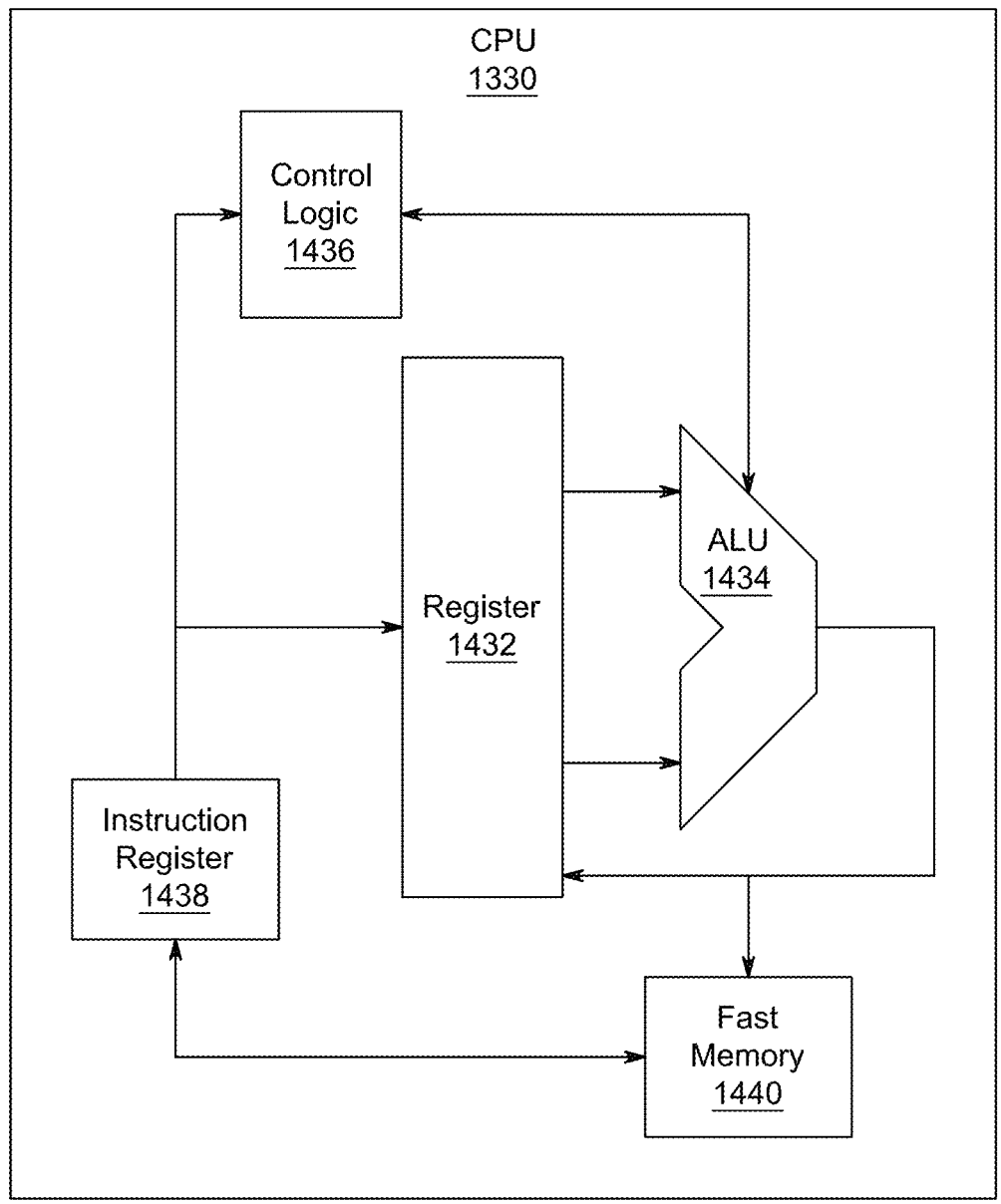
FIG. 14 is an exemplary schematic diagram of a processor used with the computing device, according to certain embodiments.

For example, FIG. 14 shows one implementation of CPU 1330. In one implementation, the instruction register 1438 retrieves instructions from the fast memory 1440. At least part of these instructions are fetched from the instruction register 1438 by the control logic 1436 and interpreted according to the instruction set architecture of the CPU 1330. Part of the instructions can also be directed to the register 1432. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1330 can use a reduced instruction set architecture, a complex instruction set architecture, a vector processor architecture, a very large instruction word architecture. Furthermore, the CPU 1330 can be based on the Von Neuman model or the Harvard model. The CPU 1330 can be a digital signal processor, an FPGA, an ASIC, a PLA, a PLD, or a CPLD. Further, the CPU 1330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 888 through a PCI bus 1362.

The PCI devices may include, for example, Ethernet adapters, add-in cards, and PC cards for notebook computers. The Hard disk drive 1360 and CD-ROM 1366 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A twin pneumatic hammer, comprising:
a first caliper arm;
a first hammer head connected to a first pneumatic cylinder, wherein the first pneumatic cylinder is mounted on the first caliper arm;
a second caliper arm;
a second hammer head connected to a second pneumatic cylinder, wherein the second pneumatic cylinder is mounted on the second caliper arm, wherein the second hammer head is positioned opposite to and facing the first hammer head;
a caliper base;
a sliding track within the caliper base, wherein the sliding track is configured to slidingly hold the first caliper arm and the second caliper arm to the caliper base such that a distance between the first caliper arm and the second caliper arm may be adjusted along a length of the caliper base;
a ruler located parallel to the sliding track, wherein the ruler includes markings indicating a distance from the first caliper arm to the second caliper arm;
a plurality of tubing configured to connect the first pneumatic cylinder and the second pneumatic cylinder to a source of compressed air; and
an air controller connected to the source of compressed air, wherein the air controller is configured to perform an impact stroke of the first hammer head and the second hammer head by controlling the release of compressed air into the plurality of tubing.

2. The twin pneumatic hammer of claim 1, further comprising:
a first piston rod located within the first pneumatic cylinder;
a second piston rod located within the second pneumatic cylinder;
a cap end port located at a first end of each pneumatic cylinder;
a first piston connected to a cap end of the first piston rod;
a rod end port located at a second end of each pneumatic cylinder; and
a second piston connected to a cap end of the second piston rod,
wherein the first hammer head is connected to a rod end of the first piston rod and the second hammer head is connected to a rod end of the second piston rod.

3. The twin pneumatic hammer of claim 2, comprising:
a first T branch divider connected by a first tubing to the source of compressed air, by a second tubing to the cap end port of the first pneumatic cylinder, and by a third tubing to the cap end port of the second pneumatic cylinder; and
a second T branch divider connected by a fourth tubing to the source of compressed air, by a fifth tubing to the rod end port of the first pneumatic cylinder and by a sixth tubing to the rod end port of the second pneumatic cylinder.

4. The twin pneumatic hammer of claim 3, wherein:
a length of the first tubing equals a length of the fourth tubing;
a length of the second tubing equals a length of the third tubing; and
a length of the fifth tubing equals a length of the sixth tubing.

5. The twin pneumatic hammer of claim 4, wherein:
the cap end port of the first pneumatic cylinder is connected to the second tubing; and
the cap end port of the second pneumatic cylinder is connected to the third tubing,
wherein the air controller is further configured to perform the impact stroke by:
simultaneously forcing the first piston rod and the second piston rod out of the first pneumatic cylinder and the second pneumatic cylinder, respectively, and towards each other by increasing air pressure at each of the cap end ports, then
simultaneously retracting the first piston rod and the second piston rod into the first pneumatic cylinder and the second pneumatic cylinder, respectively, and away from each other by releasing air pressure through each of the cap end ports while increasing air pressure at each of the rod end ports.

6. The twin pneumatic hammer of claim 5, further comprising:
a computing device connected to the air controller, wherein the computing device is configured to trigger the impact stroke.

7. The twin pneumatic hammer of claim 2, further comprising:
male threads formed in the rod end of the first piston rod;
female threads formed in a connection port of the first hammer head, wherein the male threads and the female threads are configured to connect the first hammer head to the rod end of the first piston rod;
male threads formed in the rod end of the second piston rod; and
female threads formed in a connection port of the second hammer head, wherein the male threads and the female threads are configured to connect the second hammer head to the rod end of the second piston rod.

8. The twin pneumatic hammer of claim 2, wherein the first hammer head is connected by welding to the rod end of the first piston rod and the second hammer head is connected by welding to the rod end of the second piston rod.

9. The twin pneumatic hammer of claim 2, further comprising:
a first clutch located within the first pneumatic cylinder, wherein the first clutch is configured to lock the first piston rod after each impact stroke; and
a second clutch located within the second pneumatic cylinder, wherein the second clutch is configured to lock the second piston rod after each impact stroke.

10. The twin pneumatic hammer of claim 1, wherein the source of compressed air is one of an air cannister and a portable air compressor.

11. The twin pneumatic hammer of claim 1, further comprising:
a locking mechanism connected to the sliding track, wherein the locking mechanism is configured to lock the first caliper arm and the second caliper arm at a positioning distance.

12. A method for using a twin pneumatic hammer to detect an ovalling mode in a cylindrical object, comprising:

positioning the twin pneumatic hammer on a cross sectional diagonal of the cylindrical object;

securing the twin pneumatic hammer to the cylindrical object by sliding a first caliper arm towards a second caliper arm along a sliding track then locking the first caliper arm and the second caliper arm to the sliding track;

measuring, with a ruler adjacent to the sliding track, a width of the cylindrical object;

connecting a first plurality of tubing between a source of compressed air and a cap end port of a first pneumatic cylinder and a cap end port of a second pneumatic cylinder;

connecting a second plurality of tubing between the source of compressed air and a rod end port of the first pneumatic cylinder and a rod end port of the second pneumatic cylinder;

connecting a first air valve of an air controller to the first plurality of tubing and a second air valve of the air controller to the second plurality of tubing;

performing, with the air controller, an impact stroke which simultaneously strikes opposite sides of the cylindrical object with a first hammer head and a second hammer head of the twin pneumatic hammer;

detecting, with a sensing transducer located on the cylindrical object, vibrations within the cylindrical object due to the impact stroke;

generating, with the sensing transducer, sensing signals; and analyzing, with a computing device connected to the sensing transducer, the sensing signals to detect the ovalling mode of the cylindrical object.

13. The method of claim 12, performing the impact stroke by:

opening, by the air controller, the first air valve to inject compressed air into each of the cap end ports to simultaneously extend the first piston rod and the second piston rod out of the first pneumatic cylinder and the second pneumatic cylinder, respectively, towards each other;

then closing, by the air controller, the first air valve; and then opening, by the air controller, the second air valve to inject compressed air into each of the rod end ports to simultaneously retract the first piston rod and the second piston rod into the first pneumatic cylinder and the second pneumatic cylinder, respectively, and away from each other.

14. The method of claim 13, further comprising:

connecting the air controller to the computing device; and triggering the impact stroke by controlling, by the computing device, the first air valve and the second air valve of the air controller.

15. The method of claim 14, further comprising:

connecting the sensing transducer to the cylindrical object at a position in a range of 5 cm to 20 cm above a position of the cross sectional diagonal of the cylindrical object;

connecting the sensing transducer to the computing device;

triggering, by the computing device, the air controller to perform the impact stroke;

receiving, by the computing device, the sensing signals analyzing, by the computing device, the sensing signals to detect the ovalling mode; and determining, by the computing device, a strength of the cylindrical object by matching an amplitude and frequency of the ovalling mode to a database storing records of cylindrical objects with strengths of the cylindrical objects.

16. The method of claim 14, further comprising:

connecting the sensing transducer to the cylindrical object at a position in a range of 5 cm to 20 cm above a position of the cross sectional diagonal of the cylindrical object;

connecting the sensing transducer to the computing device;

triggering, by the computing device, the air controller to perform the impact stroke;

receiving, by the computing device, the sensing signals from the sensing transducer generated by the impact stroke; and storing, in a memory of the computing device, the sensing signals.

17. A system for generating an ovalling mode in a cylindrical object, comprising:

a twin pneumatic hammer including a first pneumatic hammer and a second pneumatic hammer, wherein a hammer head of the first pneumatic hammer is configured to face a hammer head of the second pneumatic hammer along a cross sectional diagonal of the cylindrical object;

a first caliper arm configured to support the first pneumatic hammer, wherein an angle between a longitudinal axis of the first caliper arm and an axial line of the first pneumatic hammer is 90 degrees;

a second caliper arm configured to support the second pneumatic hammer, wherein an angle between a longitudinal axis of the second caliper arm and an axial line of the second pneumatic hammer is 90 degrees;

a caliper base;

a sliding track within the caliper base, wherein the sliding track is configured to slidingly hold the first caliper arm and the second caliper arm to the caliper base such that a distance between the first caliper arm and the second caliper arm may be adjusted along a length of the caliper base;

a ruler located parallel to the sliding track, wherein the ruler includes markings indicating a distance from the first caliper arm to the second caliper arm;

a plurality of tubing configured to connect a first pneumatic cylinder of the first pneumatic hammer and a second pneumatic cylinder of the second pneumatic hammer to a source of compressed air;

an air controller connected to the source of compressed air, wherein the air controller is configured to perform an impact stroke of the hammer heads of each of the first pneumatic hammer and the second pneumatic hammer by controlling the release of compressed air into the plurality of tubing;

a sensing transducer configured to be attached to the cylindrical object, wherein the sensing transducer is configured to sense vibrations in the cylindrical object and generate sensing signals;

a computing device connected to the air controller and the sensing transducer, wherein the computing device includes a memory storing program instructions and at least one processor configured to execute the program instructions, wherein the program instructions are configured to:

trigger the air controller to perform the impact stroke;

receive the sensing signals;

store the sensing signals in the memory; and analyze the sensing signals to detect the ovalling mode of the cylindrical object.

18. The system of claim 17, further comprising:

a first piston rod located within the first pneumatic cylinder;

a second piston rod located within the second pneumatic cylinder;

a cap end port located at a first end of each pneumatic cylinder;

a first piston connected to a cap end of the first piston rod;

a rod end port located at a second end of each pneumatic cylinder; and a second piston connected to a cap end of the second piston rod, wherein the hammer head of the first pneumatic hammer is connected to a rod end of the first piston rod, and the hammer head of the second pneumatic hammer is connected to a rod end of the second piston rod.

19. The system of claim 18, further comprising:

a first T branch divider connected by a first tubing to the source of compressed air, by a second tubing to the cap end port of the first pneumatic cylinder and by a third tubing to the cap end port of the second pneumatic cylinder; and a second T branch divider connected by a fourth tubing to the source of compressed air, by a fifth tubing to the rod end port of the first pneumatic cylinder and by a sixth tubing to the rod end port of the second pneumatic cylinder.

20. The system of claim 17, further comprising:

a first air valve connected between the source of compressed air and the first tubing;

a second air valve connected between the source of compressed air and the fourth tubing;

a first clutch located within the first pneumatic cylinder, wherein the first clutch is configured to lock the first piston rod after each impact stroke; and a second clutch located within the second pneumatic cylinder, wherein the second clutch is configured to lock the second piston rod after each impact stroke, wherein the air controller is further configured to perform the impact stroke by:

simultaneously forcing the first piston rod and the second piston rod out of the first pneumatic cylinder and the second pneumatic cylinder, respectively, and towards each other by increasing air pressure at each of the cap end ports, then simultaneously retracting the first piston rod and the second piston rod into the first pneumatic cylinder and the second pneumatic cylinder, respectively, and away from each other by releasing air pressure from each of the cap end ports while increasing air pressure at each of the rod end ports.

* * * * *